United States Patent
Liu et al.

(10) Patent No.: US 11,758,490 B2
(45) Date of Patent: Sep. 12, 2023

(54) PROCESSING METHOD OF SYNCHRONIZATION INDICATION INFORMATION AND DEVICE, INDICATING METHOD OF SYNCHRONIZATION SIGNAL BLOCK AND DEVICE

(71) Applicant: VIVO MOBILE COMMUNICATION CO., LTD., Chang'an Dongguan (CN)

(72) Inventors: Siqi Liu, Chang'an Dongguan (CN); Zichao Ji, Chang'an Dongguan (CN); Yu Ding, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 145 days.

(21) Appl. No.: 16/754,085

(22) PCT Filed: Sep. 11, 2018

(86) PCT No.: PCT/CN2018/104951
§ 371 (c)(1),
(2) Date: Apr. 6, 2020

(87) PCT Pub. No.: WO2019/076169
PCT Pub. Date: Apr. 25, 2019

(65) Prior Publication Data
US 2020/0314777 A1    Oct. 1, 2020

(30) Foreign Application Priority Data
Oct. 20, 2017   (CN) .......................... 201710983314.1

(51) Int. Cl.
*H04W 56/00* (2009.01)
*H04W 72/0446* (2023.01)
(Continued)

(52) U.S. Cl.
CPC ..... *H04W 56/001* (2013.01); *H04W 72/0446* (2013.01); *H04W 72/0453* (2013.01);
(Continued)

(58) Field of Classification Search
CPC ........... H04W 56/001; H04W 72/0446; H04W 74/0833; H04W 24/02; H04W 56/00;
(Continued)

(56) References Cited

U.S. PATENT DOCUMENTS

2017/0170941 A1*  6/2017  Yang ..................... H04L 5/0098
2017/0251460 A1   8/2017  Agiwal et al.
(Continued)

FOREIGN PATENT DOCUMENTS

CN      106793058 A      5/2017
WO   WO 2018/195863 A1 * 11/2018
(Continued)

OTHER PUBLICATIONS

Chinese First Office Action Application, No. 201710983314.1; dated May 11, 2020.
(Continued)

*Primary Examiner* — Rushil P. Sampat
(74) *Attorney, Agent, or Firm* — von Briesen & Roper, s.c.

(57) ABSTRACT

A method and a device of processing synchronization indication information and a method and a device of indicating a synchronization signal block are provided. The method of processing synchronization indication information is applied to a terminal and includes receiving a synchronization signal block sent by a base station; receiving synchronization indication information sent by the base station, the synchronization indication information being used to indicate the synchronization signal block sent by the base station; determining RMSI CORESET, UE-specific CORESET and an
(Continued)

other CORESET; determining a time-frequency resource position for data reception according to the multiplexing information and the synchronization indication information.

20 Claims, 5 Drawing Sheets

(51) Int. Cl.
*H04W 72/0453* (2023.01)
*H04W 72/1273* (2023.01)
*H04W 74/08* (2009.01)
*H04W 72/53* (2023.01)

(52) U.S. Cl.
CPC ....... *H04W 72/1273* (2013.01); *H04W 72/53* (2023.01); *H04W 74/0833* (2013.01)

(58) Field of Classification Search
CPC ... H04W 48/10; H04W 72/042; H04W 72/06; H04J 11/0073; H04J 11/0076
See application file for complete search history.

(56) References Cited

U.S. PATENT DOCUMENTS

| | | | | |
|---|---|---|---|---|
| 2018/0213500 | A1* | 7/2018 | Li | H04W 84/22 |
| 2019/0053235 | A1* | 2/2019 | Novlan | H04L 5/001 |
| 2020/0045662 | A1* | 2/2020 | Liu | H04W 48/12 |
| 2020/0162222 | A1* | 5/2020 | Liu | H04W 72/042 |
| 2020/0228275 | A1* | 7/2020 | Li | H04L 5/0094 |
| 2020/0260393 | A1* | 8/2020 | Zhang | H04W 74/0833 |
| 2020/0305099 | A1* | 9/2020 | Liu | H04B 7/0617 |

FOREIGN PATENT DOCUMENTS

| | | | |
|---|---|---|---|
| WO | WO 2019024087 | A1 * | 2/2019 |
| WO | WO 2019033396 | A1 * | 2/2019 |
| WO | WO 2019/056210 | A1 * | 3/2019 |

OTHER PUBLICATIONS

International Search Report & Written Opinion related to Application No. PCT/CN2018/104951: dated Nov. 30, 2018.
Zte et al.; "Remaining details of Synchronization Signal Design", 3GPP TSG RAN WG1 Meeting #90bis, R1-1717030, Prague, Czech Republic, Oct. 9, 2017-Oct. 13, 2017.
Nokia et al; "Remaining Details on Remaining Minimum System Information", 3GPP TSG-RAN WG1 NR AH#3, R1-1718613, Prague, Czech Republic, Oct. 9, 2017-Oct. 13, 2017.
CATT; "Offline summary for AI 7.1.2.2 Remaining details on Remaining Minimum System Information", 3GPP TSG RAN WG1 Meeting 90bis, R1-1718772, Prague, CZ, Oct. 9, 2017-Oct. 13, 2017.
Qualcomm Incorporated; "Remaining system information delivery consideration", 3GPP TSG RAN WG1 Meeting 90bis, R1-1718528, Prague, Oct. 9, 2017-Oct. 13, 2017.

\* cited by examiner

PROCESSING METHOD OF SYNCHRONIZATION INDICATION INFORMATION AND DEVICE, INDICATING METHOD OF SYNCHRONIZATION SIGNAL BLOCK AND DEVICE

CROSS-REFERENCE TO RELATED APPLICATION

This patent application is a 35 USC § 371 U.S. national stage of International Application No. PCT/CN2018/104951 filed on Sep. 11, 2018, which claims a priority to a Chinese Patent Application No. 201710983314.1 filed in China on Oct. 20, 2017, the disclosures of which are incorporated in their entirety by reference herein.

TECHNICAL FIELD

Embodiments of the present disclosure relate to the field of radio communication technology, and in particular, relates to a method and a device of processing synchronization indication information, and a method and a device of indicating a synchronization signal block.

BACKGROUND

In a design of a New Radio (NR) system, a base station needs to send a synchronous signal block (Synchronous Signal Block (SSB, for short)) to a terminal, so that the terminal uses the SSB to perform synchronization, system information acquisition, measurement, and so on. Multiple SSBs form a SSB burst set (SS burst set). The maximum number of SSBs contained in an SS burst set is related to a carrier frequency used by a network, wherein,
  At frequencies less than 3 gigahertz (GHz), a SS burst set may contain up to 4 SSBs;
  In a case that the carrier frequency range is from 3 GHz to 6 GHz, at most 8 SSBs may be included in one SS burst set;
  In a case that the carrier frequency range is above 6 GHz, a maximum of 64 SSBs may be included in one SS burst set.

No matter how many SSBs are included in a SS burst set, a base station needs to complete transmission of the SSBs within a time window of 5 millisecond (ms). However, the number of SSBs actually sent by the base station within the time window of 5 ms may be less than the maximum number of SSBs that may be included in one SS burst set on a frequency band. Thus, the base station needs to indicate to a terminal which SSBs are sent after the SSBs are sent. At present, a result of a 5G discussion, the base station may instruct, to the terminal through system information and Radio Resource Control (RRC, for short) signaling, which SSBs are sent to the terminal. The terminal may determine a time-frequency resource position for data reception based on indication information of received synchronization signal blocks.

However, in the present discussion, in a case that the terminal determines the time-frequency resource position for data reception based on the indication information of the received synchronization signal block, a case that a control resource set (Control resource set (CORESET, for short) is multiplexed is not considered, causing that the terminal may inaccurately determine the time-frequency resource position for data reception.

SUMMARY

In a first aspect, the embodiments of the present disclosure provide a method of processing synchronization indication information. This method is applied to a terminal and includes receiving a synchronization signal block sent by a base station; receiving synchronization indication information sent by the base station, wherein the synchronization indication information is used to indicate the synchronization signal block sent by the base station, the synchronization indication information is first indication information, or the synchronization indication information includes the first indication information and second indication information, the first indication information is sent by the base station through system information and the second indication information is sent by the base station through a Radio Resource Control signaling; and determining multiplexing information among at least two of RMSI CORESET, UE-specific CORESET and an other CORESET.

In a second aspect, the embodiments of the present disclosure provide a method of indicating a synchronization signal block. This method is applied to a base station and includes sending a synchronization signal block; and sending synchronization indication information, wherein the synchronization indication information is used to indicate the synchronization signal block sent by the base station, the synchronization indication information is first indication information, or the synchronization indication information includes the first indication information and second indication information, the first indication information is sent by the base station through system information and the second indication information is sent by the base station through a Radio Resource Control signaling.

In a third aspect, the embodiments of the present disclosure provide a terminal. The terminal includes: a first receiving module, used to receive a synchronization signal block sent by a base station; a second receiving module, used to receive synchronization indication information sent by the base station, wherein the synchronization indication information is used to indicate the synchronization signal block sent by the base station, the synchronization indication information is first indication information, or the synchronization indication information includes the first indication information and second indication information, the first indication information is sent by the base station through system information and the second indication information is sent by the base station through a radio resource control signaling; a determining module, used to determine multiplexing information among at least two of RMSI CORESET, a UE-specific CORESET and an other CORESET; and a first determining module, used to determine a time-frequency resource position for data reception according to the multiplexing information and the synchronization indication information.

In a fourth aspect, the embodiments of the present disclosure provide a base station. The base station includes a first sending module, used to send a synchronization signal block; and a second sending module, used to send synchronization indication information, wherein the synchronization indication information is used to indicate the synchronization signal block sent by the base station, the synchronization indication information is first indication information, or the synchronization indication information includes the first indication information and second indication information, the first indication information is sent by the base station through system information and the second indication information is sent by the base station through a radio resource control signaling.

In a fifth aspect, the embodiments of the present disclosure provide a terminal. The terminal includes a processor, a storage and a computer program stored on the storage and executable by the processor, wherein when the computer program is executed by the processor, the processor implements steps of the method of processing synchronization indication information provided above.

In a sixth aspect, the embodiments of the present disclosure provide a base station. The base station includes a processor, a storage and a computer program stored on the storage and executable by the processor, wherein when the computer program is executed by the processor, the processor implements steps of the method of indicating a synchronization signal block provided above.

In a seventh aspect, the embodiments of the present disclosure provide a computer readable storage medium, wherein a computer program is stored on the computer readable storage medium, and when the computer program is executed by a processor, the processor implements the step of the method of processing synchronization indication information provided above.

In an eighth aspect, the embodiments of the present disclosure provide a computer readable storage medium, wherein a computer program is stored on the computer readable storage medium, and when the computer program is executed by a processor, the processor implements the step of the method of indicating a synchronization signal block provided above.

BRIEF DESCRIPTION OF THE DRAWINGS

In order to more clearly illustrate technical solutions of embodiments of the present disclosure, accompany drawings to be used in description of the embodiments of the present disclosure will be briefly described below. It is apparent that the accompanying drawings in the following description are only some embodiments of the present disclosure, for those of ordinary skills in the art, other drawings may also be obtained based on these drawings without creative labor.

DETAILED DESCRIPTION

In order to make objectives, technical solutions and advantages of the embodiments of the present disclosure clearer, the technical solutions of the embodiments of the present disclosure will be clearly and completely described in combination with the accompanying drawings of the embodiments of the present disclosure. It will be apparent that the described embodiments are a part, rather than all, of embodiments of the present disclosure. All other embodiments obtained by those of ordinary skills in the art based on the described embodiments of the present disclosure fall within the protection scope of the present disclosure.

First Embodiment

Figure 1:
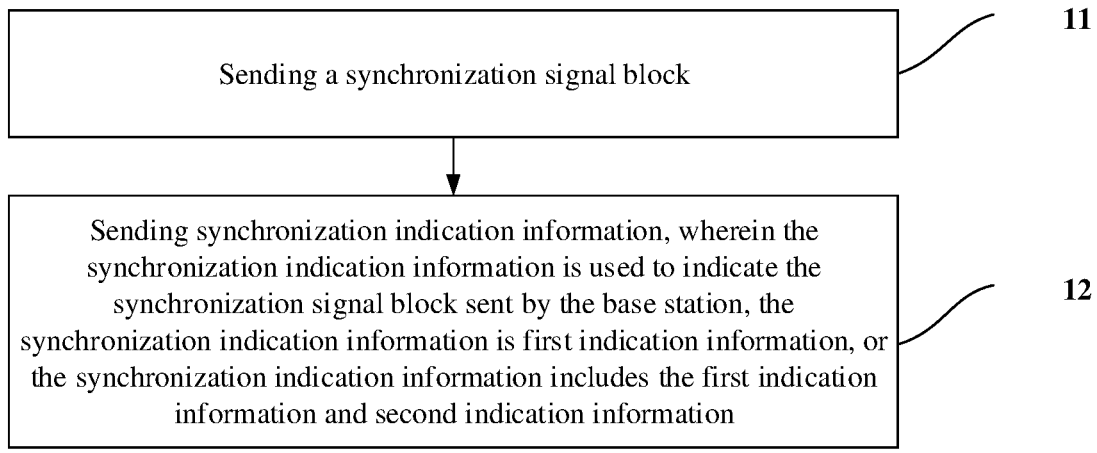
FIG. 1 is a flow chart of a method of indicating a synchronization signal block according to a first embodiment of the present disclosure.

Referring to FIG. 1, FIG. 1 is a flow chart of a method of indicating a synchronization signal block according to the first embodiment of the present disclosure. The method is applied to a base station. The base station includes following steps.

Step 11: sending a synchronization signal block.

The synchronization signal block sent by the base station is sent in a broadcast manner.

Step 12: sending synchronization indication information, wherein the synchronization indication information is used to indicate the synchronization signal block sent by the base station, the synchronization indication information is first indication information, or the synchronization indication information includes the first indication information and second indication information, the first indication information is sent by the base station through system information and the second indication information is sent by the base station through a RRC signaling.

In the embodiments of the present disclosure, optionally, the system information may be remaining minimum system information (Remaining Minimum System Information (RMSI, for short)). Of course, in some other embodiments of the present disclosure, it is also not excluded that the first indication information is sent by using other system information.

In the embodiments of the present disclosure, synchronization signal blocks sent by the base station indicated in second indication information corresponding to different terminals are the same or different.

In the embodiments of the present disclosure, the base station sends the synchronization indication information to a terminal to enable the terminal to perform a corresponding operation according to a synchronization signal block sent by the base station indicated in the synchronization indication information.

For example, the corresponding operation may include at least one of following: determining a time-frequency resource position and a rate de-matching for received information; measuring the synchronization signal block; measuring the synchronization signal block, and using the synchronization signal block for radio link monitoring; and the like.

The received information may include at least one of an RMSI CORESET, an RMSI Physical Downlink Shared Channel (PDSCH), a User Equipment (UE)-specific CORESET, a UE-specific PDSCH, a Common PDSCH and an other CORESET.

The other CORESET is a CORESET different from the RMSI CORESET and the UE-specific CORESET; or the other CORESET is a CORESET other than the RMSI CORESET and the UE-specific CORESET, for example, a CORESET of a Random Access Channel (RACH) message, a CORESET of a broadcasted OSI, a CORESET of a Paging, etc.

The common PDSCH is a PDSCH different from the RMSI PDSCH and the UE-specific PDSCH; or the common PDSCH is a PDSCH other than the RMSI PDSCH and the UE-specific PDSCH, for example, a PDSCH of the RACH message, a PDSCH of the broadcasted OSI, a PDSCH of the Paging, and the like.

The RACH message includes a Random Access Response (RAR, i.e., Msg2) and contention resolution (Contention Resolution, i.e., Msg4) in a RACH procedure.

The PDSCH is a Physical Downlink Shared Channel. The UE-specific PDSCH is a PDSCH specific to a terminal.

In the embodiments of the present disclosure, the base station sends synchronization indication information to the terminal, so as to assist the terminal in obtaining the correct synchronization signal block actually sent by the base station, thereby enabling the terminal to correctly determine the time-frequency resource position and the rate de-matching of the received information, measurement or radio link monitoring, etc.

In a case that the base station indicates the sent synchronization signal block by using the first indication information sent by the RMSI in a frequency band in a carrier frequency range of 6 GHz or more, the indication can be made in a form of an 8-bit group bitmap+an 8-bit intra-group bitmap. The group bitmap indicates which synchronization signal block groups are sent by the base station, and the intra-group bitmap indicates which synchronization signal blocks in the synchronization signal block groups are sent by the base station, and in information for the indication, the synchronization signal blocks sent in each group are the same. For example, in a case that a carrier frequency range is above 6 GHz, at most 64 synchronization signal blocks may be included in one SS burst set, and the 64 synchronization signal blocks possibly sent are divided into 8 groups. Assuming that the group bitmap is "11000000" which indicates that the base station sent a first and a second synchronization signal block groups, and an intra-group bitmap is "11110000" which indicates that the base station sent a first to a fourth synchronization signal blocks within the first and the second groups, i.e., indicating that a total of 2×4=8 synchronization signal blocks have been sent. Since indication information of the synchronization signal blocks sent in different groups are the same, a case where the synchronization signal blocks sent in the different groups are different among the groups cannot be indicated, resulting in that the synchronization signal block indicated by the base station in the RMSI may not coincide with the synchronization signal block actually sent by the base station. For example, the first to the four synchronization signal blocks in the first synchronization signal block group are sent, but only the first and the second synchronization signal blocks are sent in the second synchronization signal block group, whereas the intra-group bitmap indicates "11110000", causing that the synchronization signal blocks (8 synchronization signal blocks) indicated in the RMSI may not coincide with the synchronization signal blocks (6 synchronization signal blocks) actually sent by the base station. After a terminal receives the synchronization signal blocks indicated by the base station in the RMSI, the terminal determines that the synchronization signal blocks actually sent by the base station are the indicated synchronization signal blocks, and performs measurement, radio link monitoring, data reception, data transmission, and the like based on the indicated synchronization signal blocks. If information of the synchronization signal blocks indicated by the base station is inaccurate, the terminal may try to search and detect some undetectable synchronization signal blocks, which will cause unnecessary power consumption, or, the terminal may not search and detect some of the actually sent synchronization signal blocks, resulting in inaccurate measurement results or incorrect link monitoring results, or the terminal cannot ensure correctly perform a rate de-matching and reception of the PDSCH/the CORESET.

In the embodiments of the present disclosure, optionally, the second indication information may indicate, in a full bitmap (Full bitmap) manner, the synchronization signal block sent by the base station. That is, in a case that a SS burst set can contain at most L synchronization signal blocks (L=4/8/64), a bitmap having a length L is used to indicate which synchronization signal blocks are actually sent. For example, in a frequency band in a carrier frequency range of above 6 GHz, a 64-bit bitmap may be used to indicate a synchronization signal block sent by the base station. Since the second indication information indicates, in the full bitmap manner, the synchronization signal block sent by the base station, such indication is more accurate, and accordingly, such a circumstance is reduced that information of the synchronization signal block indicated by the base station through the RMSI is inaccurate, and thus such problems are addressed that the terminal is caused to also attempt to search and detect some undetectable synchronization signal blocks and unnecessary power consumption is generated, or the terminal is caused to not search or detect some actually sent synchronization signal blocks, leading to inaccurate measurement results, incorrect link monitoring results, or inability to guarantee the terminal to perform correct rate de-matching and reception of PDSCH/CORESET.

In a case that the base station sends synchronization signal blocks through a plurality of beams, different synchronization signal blocks may be associated with different beams, and the base station may flexibly configure mapping relationship between the beams and the synchronization signal blocks according to requirements, that is, different synchronization signal blocks may be sent on different beams, wherein directions of some beams are completely incapable of being directed at the terminal at all, and the synchronization signal blocks sent on the beams cannot be searched by the terminal accordingly. In such a case, if the terminal searches and detects all of synchronization signal blocks indicated by the base station through the system information, it means that the terminal may try to search and detect some undetectable synchronization signal blocks, causing unnecessary power consumption. In the embodiments of the present disclosure, the base station can use the second indication information to more accurately indicate the synchronization signal blocks sent by the base station on different beams, so as to reduce inaccuracy of the information of the synchronization signal blocks indicated by the base station through the system information, and reduce possibility that the terminal may also attempt to search and detect some undetectable synchronization signal blocks and reduce unnecessary power consumption.

The synchronization signal block and a terminal-dedicated PDSCH/CORESET may be sent on the same time-frequency resource. In such a case, the base station may perform space-division multiplexing on the synchronization signal block and the terminal-dedicated PDSCH/CORESET, and the synchronization signal block and the terminal-dedicated PDSCH/CORESET that are space-division-multiplexed are sent through different beams, thereby reducing mutual interference. In such a case, the terminal needs to know information of the synchronization signal block actually sent by the base station, so as to ensure that the terminal and the base station have consistent understanding of a manner in which the base station performs the rate-matching.

Thus, in some optional embodiments of the present disclosure, sending the synchronization signal blocks may include: sending the synchronization signal block through a first beam covering a first terminal and sending PDSCH data and/or CORESET to a second terminal through a second beam covering the second terminal, on a same time-frequency resource.

Sending synchronization indication information includes: sending the second indication information (such as first second indication information and second second indication information) to the first terminal and the second terminal through a radio resource control signaling, wherein the first second indication information corresponding to the first terminal indicates the synchronization signal block sent by the base station through the first beam on a current time-frequency resource, the second second indication information corresponding to the second terminal indicates that the base station does not send the synchronization signal block through the second beam on the current time-frequency resource; or, both the first second indication information corresponding to the first terminal and the second indication information corresponding to the second terminal indicate the synchronization signal block sent by the base station on the current time-frequency resource.

In the embodiments of the present disclosure, in a case that the synchronization signal block and the terminal-specific PDSCH/CORESET are sent on the same time-frequency resources and are space-division-multiplexed, the second indication information can more accurately indicate, to the terminal, the synchronization signal block sent by the base station on the current time-frequency resource so as to avoid the problem that the terminal cannot obtain the synchronization signal block actually sent by the base station, and an error in the rate de-matching at the terminal is caused.

In the 5G system, carrier aggregation (Carrier Aggregation (CA)) is introduced to improve a throughput and a resource utilization. A carrier set is a set of two or more component carrier (Component Carrier (CC)) aggregated together to support a greater transmission bandwidth, wherein, a component carrier corresponds to an independent cell (Cell) and the cell can have following types in a CA scenario: a primary cell (Primary Cell (PCell, for short)) and a secondary cell (Secondary Cell (SCell, for short)). The primary cell operates on a primary frequency band and is a cell to be connected to at an initial connection establishment/connection re-establishment procedure. The secondary cell operates on a secondary frequency band and is used for providing a terminal with additional radio resources required for service transmission, and the terminal does not need to initially access the Scell.

In a carrier aggregation scenario, the secondary cell may also send a synchronization signal block, however, the terminal does not attempt access on the secondary cell and therefore does not read the synchronization signal block of the secondary cell. Thus, the terminal cannot acquire information of the synchronization signal block actually sent, through the first indication information sent from a system. The first indication information only indicates the synchronization signal block sent by the primary cell. In a case that scheduling and transmission of downlink data occur between a terminal and a secondary cell, an error in the rate de-matching may occur because information of synchronization signal blocks actually sent by the secondary cell is not known by the terminal. Thus, in some embodiments of the present disclosure, optionally, the method of indicating the synchronization signal block further includes: sending third indication information to the terminal through the radio resource control signaling, wherein the third indication information is used to indicate the synchronization signal block sent by the secondary cell.

Thus, the terminal can know the synchronization signal block sent by the secondary cell, and can correctly perform the rate de-matching in a case that scheduling and transmission of downlink data occur between the terminal and the secondary cell.

After the terminal receives the synchronization signal block, the terminal may measure the synchronization signal block and report a result of the measurement, and the base station performs a cell handover procedure or a cell reselection procedure according to the result of the measurement. In order to enable the terminal to obtain more accurate information of the synchronization signal block for performing measurement, in some embodiments of the present disclosure, optionally, the method of indicating the synchronization signal block further includes: sending fourth indication information to the terminal through the radio resource control signaling, wherein the fourth indication information is used to indicate a synchronization signal block needed to be measured by the terminal. Accordingly, the terminal is assisted to measure the synchronization signal block, and a time duration required for blind detection and measurement of the synchronization signal block is shortened, and energy of the terminal may be reduced.

The synchronization signal block indicated in the fourth indication information may be a synchronization signal block in an SMTC (SS block based RRM measurement timing configuration) measurement period, or at least one of synchronization signal blocks indicated in the fourth indication information may not be a synchronization signal block within the SMTC measurement time period.

In the embodiments of the present disclosure, synchronization signal blocks, sent by the base station indicated in the fourth indication information corresponding to different terminals, that the terminals need to measure during the SMTC measurement period may be the same or different.

In the embodiments of the present disclosure, the fourth indication information may indicate, in a full bitmap manner, the synchronization signal block needed to be measured by the terminal.

In the embodiments of the present disclosure, in a case that the fourth indication information is used for a serving cell (i.e., a corresponding SMTC is used for measuring the serving cell), the fourth indication information may be the same as or different from the second indication information, and may also be the same as or different from the third indication information. For example, in a case that a neighbor cell and a local cell measured by a corresponding SMTC are intra-frequency cells, the fourth indication information may be a union set of the second indication information of the local cell and the second indication information of the neighbor cell, or may be a subset of the union set; in a case that the neighbor cell and the local cell measured by the SMTC are inter-frequency cells, the fourth indication information may be the same as the second indication information or may be a subset of the second indication information.

In addition, in the embodiments of the present disclosure, if the base station does not configure the indication information to a terminal in a connected state, the terminal measures all synchronization signal blocks in the SMTC measurement period by default. For a terminal in an idle state, the base station does not configure the fourth indication information, and the terminal measures all synchronization signal blocks in the SMTC measurement period by default.

A synchronization signal block may also be used for radio link monitoring (Radio Link Monitoring (RLM, for short)). In order to enable the terminal to obtain more accurate information of the synchronization signal block for the radio link monitoring, in some embodiments of the present disclosure, optionally, the method of indicating the synchronization signal block further includes: sending fifth indication information to the terminal through the radio resource control signaling, wherein the fifth indication information is used to indicate a synchronization signal block needed to be measured by the terminal and being used for the radio link monitoring.

In some embodiments, the fifth indication information indicates, in a bitmap manner, the synchronization signal block needed to be measured and being used for the radio link monitoring; optionally the fifth indication information indicates, in a full bitmap manner, the synchronization signal block needed to be measured and being used for the radio link monitoring, so that the indicated synchronization signal block needed to be measured and being used for the radio link monitoring is more accurate.

In some other embodiments, the fifth indication information indicates the number of synchronization signal blocks needed to be measured and used for radio link monitoring, e.g., indicates that synchronization signal blocks needed to be measured and being used for the radio link monitoring are the first two synchronization signal blocks of the synchronization signal blocks actually received, so as to reduce the number of bits occupied by the fifth indication information.

In some other embodiments, the fifth indication information indicates a time index of a synchronization signal block needed to be measured and used for radio link monitoring.

Second Embodiment

Figure 2:
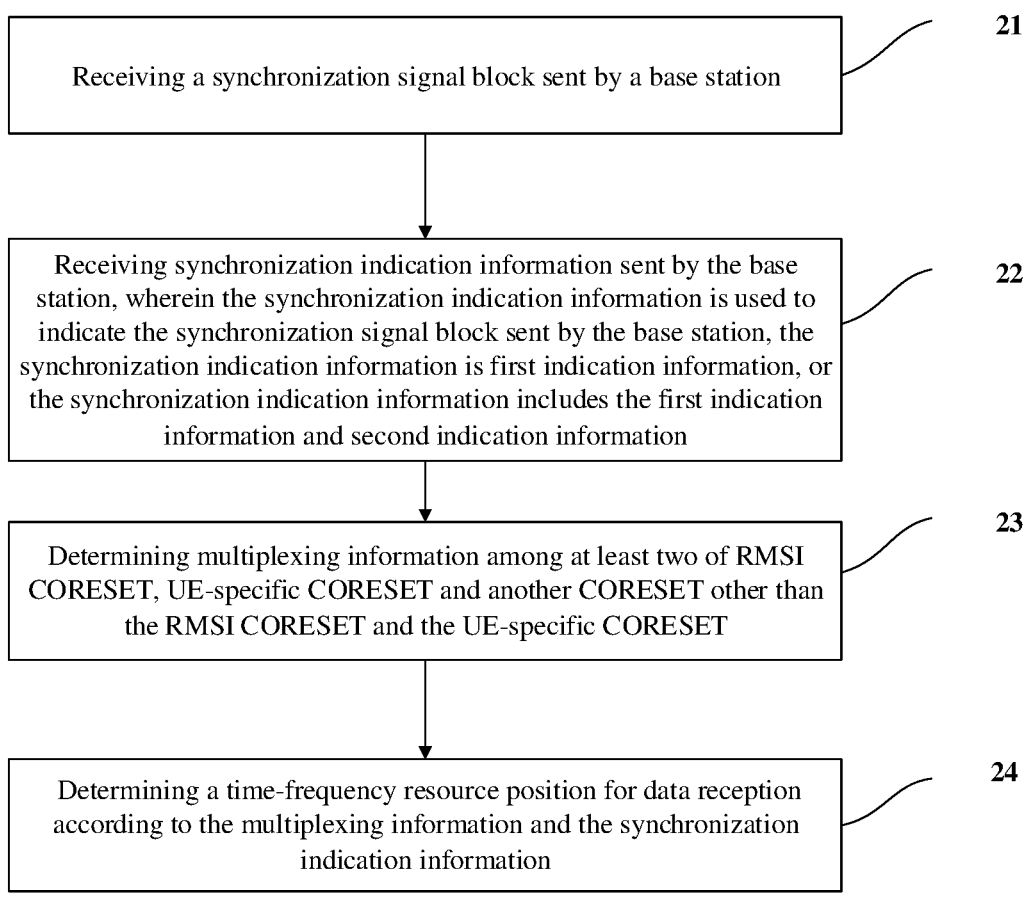
FIG. 2 is a flow chart of a method of processing synchronization indication information according to a second embodiment of the present disclosure.

Referring to FIG. 2, the second embodiment of the present disclosure further provides a method of processing synchronization indication information. The method is applied to a terminal and including following steps.

Step 21: receiving a synchronization signal block sent by a base station.

The synchronization signal block sent by the base station is sent in a broadcast manner.

Step 22: receiving synchronization indication information sent by the base station, wherein the synchronization indication information is used to indicate the synchronization signal block sent by the base station, the synchronization indication information is first indication information, or the synchronization indication information includes the first indication information and second indication information, the first indication information is sent by the base station through system information and the second indication information is sent by the base station through a Radio Resource Control (RRC) signaling.

In the embodiments of the present disclosure, optionally, the system information may be remaining minimum system information (Remaining Minimum System Information (RMSI)). Of course, in some other embodiments of the present disclosure, it is also not excluded that the first indication information is sent by using other system information.

Step 23: determining multiplexing information among at least two of an RMSI CORESET, a UE-specific CORESET and an other CORESET.

Step 24: determining a time-frequency resource position for data reception according to the multiplexing information and the synchronization indication information.

The received information may include at least one of: the RMSI CORESET, an RMSI PDSCH, a UE-specific CORESET, a UE-specific PDSCH, a Common PDSCH and an other CORESET.

The other CORESET is a CORESET different from the RMSI CORESET and the UE-specific CORESET; or the other CORESET is a CORESET other than the RMSI CORESET and the UE-specific CORESET, for example, a CORESET of an RACH message, a CORESET of a broadcasted OSI, a CORESET of a Paging, etc.

The common PDSCH is a PDSCH different from the RMSI PDSCH and the UE-specific PDSCH; or the common PDSCH is a PDSCH other than the RMSI PDSCH and the UE-specific PDSCH, for example, a PDSCH of the RACH message, a PDSCH of the broadcasted OSI, a PDSCH of the Paging, and the like.

The RACH message includes a Random Access Response (RAR, i.e., Msg2) and contention resolution (Contention Resolution, i.e., Msg4) in a RACH procedure.

The UE-specific PDSCH is a PDSCH specific to a terminal.

In the embodiments of the present disclosure, the terminal can determine a resource location for data reception more accurately according to the synchronization indication information sent by the base station and a multiplexing condition of CORESETs.

A carrying capacity of a physical channel is limited, and the base station needs to perform a rate-matching processing before sending data, i.e., repeating or puncturing bits on a transmission channel so that the sent data matches the carrying capacity of a physical channel. For downlink, the terminal needs to perform rate-de-matching in order to receive normally a downlink channel, i.e., recover the punctured bits or remove repeated bits, so as to obtain a complete data stream before the base station performs the rate-matching. In a Long Term Evolution (LTE) Rel-10, in a case that the base station maps PDSCH data onto physical resources, the base station avoids a resource element (Resource Element (RE, for short)) occupied by a cell-based reference signal (CSI-RS). That is, the RE is to be used by the CSI-RS and cannot be used by the PDSCH. The terminal in a Rel-10 may, in a case of performing the rate de-matching, assume that the RE occupied by the CSI-RS is not occupied by PDSCH data. Both the base station and the terminal need to have a consistent understanding of how the base station performs rate matching. Rate matching and rate de-matching also need to be performed in the NR. Similarly, the base station also needs, in a case of mapping terminal-specific PDSCH/CORESET data onto a physical resource, to consider avoiding the RE occupied by the synchronization signal block. In a case that the terminal performs the rate de-matching, the terminal assumes that the RE occupied by the synchronization signal block is not occupied by the terminal-specific PDSCH/CORESET data.

In order to correctly perform the rate de-matching, in some embodiments of the present disclosure, the synchronization indication information may optionally include second indication information. The second indication information is used for indicating a synchronization signal block sent by the base station, wherein, synchronization signal blocks sent by the base station indicated in the second indication information (for example auxiliary indication information) corresponding to different terminals are the same or different.

In the embodiments of the present disclosure, optionally, the second indication information may indicate, in a full bitmap manner, a synchronization signal block sent by the base station. Since the second indication information indicates, in a full bitmap manner, the synchronization signal block sent by the base station, such indication is more accurate, and such problems are addressed that information of the synchronization signal block indicated by the base station through the system information is inaccurate, and that the terminal is caused to possibly attempt to search and detect some undetectable synchronization signal blocks and unnecessary power consumption is generated, or that the terminal is caused to not search or detect some actually sent synchronization signal blocks and an inaccurate measurement result is obtained or a link monitoring result is incorrect, or that it cannot be ensured that the terminal performs correct rate de-matching and reception of PDSCH/CORESET.

In the embodiments of the present disclosure, the base station may configure configuration information of three types of CORESETs (the RMSI CORESET, the UE-specific CORESET and an other CORESET) to the terminal, the configuration information includes time-frequency domain information of a corresponding CORESET, so that the terminal can determine multiplexing relationship among at least two of the three types of CORESETs according to the configuration information, determine multiplexing information among at least two of the RMSI CORESET, the UE-specific CORESET and the other CORESET.

In some embodiments of the present disclosure, for a case where one of the RMSI CORESET, the other CORESET, and the UE-specific CORESET is not multiplexed with the remaining two CORESETs: in a case that the synchronization indication information includes the first indication information and the second indication information, determining a time-frequency resource position for data reception according to the multiplexing information and the synchronization indication information may include: (1) in a case that the RMSI CORESET is not multiplexed with the other CORESET and the RMSI CORESET is not multiplexed with the UE-specific CORESET, determining, for the RMSI PDSCH and the RMSI CORESET, whether or not a time-frequency resource position of the RMSI PDSCH or the RMSI CORESET is overlapped with a time-frequency resource position of the synchronization signal block sent by the base station indicated in the first indication information and/or the second indication information; if overlaps, then determining the overlapped time-frequency resource position is used for sending the RMSI PDSCH or the RMSI CORESET; if not overlaps, then determining that the synchronization signal block sent by the base station indicated in the first indication information and/or the second indication information is the synchronization signal block actually sent by the base station; (2) in a case that the UE-specific CORESET is not multiplexed with the other CORESET and the UE-specific CORESET is not multiplexed with the RMSI CORESET, determining, for the UE-specific PDSCH and the UE-specific CORESET, that the synchronization signal block sent by the base station indicated in the second indication information is a synchronization signal block actually sent by the base station, and determining that the UE-specific PDSCH and the UE-specific CORESET are transmitted at time-frequency resource positions other than the time-frequency resource position of the synchronization signal block sent by the base station indicated in the second indication information; (3) in a case that the other CORESET is not multiplexed with the UE-specific CORESET and the other CORESET is not multiplexed with the RMSI CORESET, determining, for a common PDSCH and an other CORESET, that a synchronization signal block sent by the base station indicated in the first indication information is a synchronization signal block actually sent by the base station, and determining that the common PDSCH and the other CORESET are sent on time-frequency resource positions other than the time-frequency resource position of the synchronization signal block sent by the base station indicated in the first indication information.

In some embodiments of the present disclosure, in a case that the synchronization indication information is the first indication information, determining the time-frequency resource position for data reception according to the multiplexing information and the synchronization indication information may include: (1) in a case that the RMSI CORESET is not multiplexed with the other CORESET and the RMSI CORESET is not multiplexed with the UE-specific CORESET, determining, for the RMSI PDSCH and the RMSI CORESET, whether or not a time-frequency resource position of the RMSI PDSCH or the RMSI CORESET is overlapped with a time-frequency resource position of the synchronization signal block sent by the base station indicated in the first indication information; if overlaps, then determining the overlapped time-frequency resource position is used for sending the RMSI PDSCH or the RMSI CORESET; if not overlaps, then determining that the synchronization signal block sent by the base station indicated in the first indication information is the synchronization signal block actually sent by the base station; (2) in a case that the UE-specific CORESET is not multiplexed with the other CORESET and the UE-specific CORESET is not multiplexed with the RMSI CORESET, determining, for the UE-specific PDSCH and the UE-specific CORESET, that the synchronization signal block sent by the base station indicated in the first indication information is a synchronization signal block actually sent by the base station, and determining that the UE-specific PDSCH and the UE-specific CORESET are transmitted at time-frequency resource positions other than the time-frequency resource position of the synchronization signal block sent by the base station indicated in the first indication information; (3) in a case that the other CORESET is not multiplexed with the UE-specific CORESET and the other CORESET is not multiplexed with the RMSI CORESET, determining, for a common PDSCH and an other CORESET, that a synchronization signal block sent by the base station indicated in the first indication information is a synchronization signal block actually sent by the base station, and determining that the common PDSCH and the other CORESET are sent on time-frequency resource positions other than the time-frequency resource position of the synchronization signal block sent by the base station indicated in the first indication information.

In some embodiments of the present disclosure, determining the time-frequency resource position for data reception according to the multiplexing information and the synchronization indication information includes: (1) in a case that the synchronization indication information is the first indication information, and the multiplexing information indicates that at least one of the other CORESET and the UE-specific CORESET are multiplexed with the RMSI CORESET, and in a case that the time-frequency resource position of the multiplexed CORESET is overlapped with the time-frequency resource position of the synchronization signal block sent by the base station indicated in the first indication information, determining that the overlapped time-frequency resource position is used for receiving the multiplexed CORESET; or (2) in a case that the synchronization indication information includes the first indication information and the second indication information, and the multiplexing information indicates that at least one of the other CORESET and the UE-specific CORESET are multiplexed with and the RMSI CORESET, and in a case that the time-frequency resource position of the multiplexed CORESET is overlapped with the time-frequency resource position of the synchronization signal block sent by the base station indicated in the first indication information and/or the second indication information, determining that the overlapped time-frequency resource position is used for receiving the multiplexed CORESET.

In some embodiments of the present disclosure, determining the time-frequency resource position for data reception according to the multiplexing information and the synchronization indication information includes: in a case that the multiplexing information indicates that the UE-specific CORESET and the other CORESET are multiplexed, but neither the UE-specific CORESET nor the other CORESET is multiplexed with the RMSI CORESET, determining that the synchronization signal block sent by the base station indicated in the first indication information is a synchronization signal block actually sent by the base station, and, determining that the multiplexed CORESET is sent on a time-frequency resource position other than the time-frequency resource position of the synchronization signal block sent by the base station indicated in the first indication information.

In some embodiments of the present disclosure, determining the time-frequency resource position for data reception according to the multiplexing information and the synchronization indication information includes: (1) in a case that the synchronization indication information is the first indication information, and the multiplexing information indicates that the other CORESET and the RMSI CORESET are multiplexed, but neither the other CORESET nor the RMSI CORESET is multiplexed with the UE-specific CORESET, and the time-frequency resource position of the common PDSCH scheduled by the multiplexed CORESET is overlapped with the time-frequency resource position of the synchronization signal block sent by the base station indicated in the first indication information, determining the overlapped time-frequency resource position is used for sending the common PDSCH scheduled by the multiplexed CORESET; or in a case that the synchronization indication information is the first indication information, and the multiplexing information indicates that the other CORESET and the RMSI CORESET are multiplexed, but neither the other CORESET nor the RMSI CORESET is multiplexed with the UE-specific CORESET, and the time-frequency resource position of the RMSI PDSCH scheduled by the multiplexed CORESET is overlapped with the time-frequency resource position of the synchronization signal block sent by the base station indicated in the first indication information, determining the overlapped time-frequency resource position is used for sending the RMSI PDSCH scheduled by the multiplexed CORESET; or (2) in a case that the synchronization indication information includes the first indication information and the second indication information, and the multiplexing information indicates that the other CORESET and the RMSI CORESET are multiplexed, but neither the other CORESET nor the RMSI CORESET is multiplexed with the UE-specific CORESET, and the time-frequency resource position of the common PDSCH scheduled by the multiplexed CORESET is overlapped with the time-frequency resource position of the synchronization signal block sent by the base station indicated in the first indication information and/or the second indication information, determining that the overlapped time-frequency resource position is used for sending the common PDSCH scheduled by the multiplexed CORESET; or in a case that the synchronization indication information includes the first indication information and the second indication information, and the multiplexing information indicates that the other CORESET and the RMSI CORESET are multiplexed, but neither the other CORESET nor the RMSI CORESET is multiplexed with the UE-specific CORESET, and the time-frequency resource position of the RMSI PDSCH scheduled by the multiplexed CORESET is overlapped with the time-frequency resource position of the synchronization signal block sent by the base station indicated in the first indication information and/or the second indication information, determining the overlapped time-frequency resource position is used for sending the RMSI PDSCH scheduled by the multiplexed CORESET.

In some embodiments of the present disclosure, determining the time-frequency resource position for data reception according to the multiplexing information and the synchronization indication information includes: (1) in a case that the synchronization indication information is the first indication information and the multiplexing information indicates that both the UE-specific CORESET and the other CORESET are multiplexed with the RMSI CORESET, performing the following: (a) in a case that the time-frequency resource position of the common PDSCH scheduled by the multiplexed CORESET is overlapped with the time-frequency resource position of the synchronization signal block sent by the base station indicated in the first indication information, determining that the overlapped time-frequency resource position is used for sending the common PDSCH scheduled by the multiplexed CORESET; or (b) in a case that the time-frequency resource position of the RMSI PDSCH scheduled by the multiplexed CORESET is overlapped with the time-frequency resource position of the synchronization signal block sent by the base station indicated in the first indication information, determining that the overlapped time-frequency resource position is used for sending the RMSI PDSCH scheduled by the multiplexed CORESET; or (c) determining, for the UE-specific PDSCH scheduled by the multiplexed CORESET, that the synchronization signal block sent by the base station indicated in the first indication information is the synchronization signal block actually sent by the base station, and determining that the UE-specific PDSCH scheduled by the multiplexed CORESET is sent on a time-frequency resource position other than the time-frequency resource position of the synchronization signal block sent by the base station indicated in the first indication information; or (2) in a case that the synchronization indication information includes the first indication information and the second indication information, and the multiplexing information indicates that both the UE-specific CORESET and the other CORESET are multiplexed with the RMSI CORESET, performing the following: (d) in a case that the time-frequency resource position of the common PDSCH scheduled by the multiplexed CORESET is overlapped with the time-frequency resource position of the synchronization signal block sent by the base station indicated in the first indication information and/or the second indication information, determining that the overlapped time-frequency resource position is used for sending the common PDSCH scheduled by the multiplexed CORESET; or (e) in a case that the time-frequency resource position of the RMSI PDSCH scheduled by the multiplexed CORESET is overlapped with the time-frequency resource position of the synchronization signal block sent by the base station indicated in the first indication information and/or the second indication information, determining the overlapped time-frequency resource position is used for sending the RMSI PDSCH scheduled by the multiplexed CORESET; or (f) determining, for the UE-specific PDSCH scheduled by the multiplexed CORESET, that the synchronization signal block sent by the base station indicated in the second indication information is a synchronization signal block actually sent by the base station, and determining that the UE-specific PDSCH scheduled by the multiplexed CORESET is sent on a time-frequency resource position other than the time-frequency resource position of the synchronization signal block sent by the base station indicated in the second indication information.

In some embodiments of the present disclosure, determining the time-frequency resource position for data reception according to the multiplexing information and the synchronization indication information includes: (1) in a case that the synchronization indication information is the first indication information, and the multiplexing information indicates that the UE-specific CORESET and the RMSI CORESET are multiplexed, but neither the UE-specific CORESET nor the RMSI CORESET is multiplexed with the other CORESET, performing the following: (a) in a case that the time-frequency resource position of the RMSI PDSCH scheduled by the multiplexed CORESET is overlapped with the time-frequency resource position of the synchronization signal block sent by the base station indicated in the first indication information, determining that the overlapped time-frequency resource position is used for sending the RMSI PDSCH scheduled by the multiplexed CORESET; or (b) determining, for the UE-specific PDSCH scheduled by the multiplexed CORESET, that the synchronization signal block sent by the base station indicated in the first indication information is the synchronization signal block actually sent by the base station, and determining that the UE-specific PDSCH scheduled by the multiplexed CORESET is sent on a time-frequency resource position other than the time-frequency resource position of the synchronization signal block sent by the base station indicated in the first indication information; or (2) in a case that the synchronization indication information includes the first indication information and the second indication information, and the multiplexing information indicates that the UE-specific CORESET and the RMSI CORESET are multiplexed, but neither the UE-specific CORESET nor the RMSI CORESET is multiplexed with the other CORESET, performing the following: (c) in a case that the time-frequency resource position of the RMSI PDSCH scheduled by the multiplexed CORESET is overlapped with the time-frequency resource position of the synchronization signal block sent by the base station indicated in the first indication information and/or the second indication information, determining that the overlapped time-frequency resource position is used for sending the RMSI PDSCH scheduled by the multiplexed CORESET; or (d) determining, for the UE-specific PDSCH scheduled by the multiplexed CORESET, that the synchronization signal block sent by the base station indicated in the second indication information is a synchronization signal block actually sent by the base station, and determining that the UE-specific PDSCH scheduled by the multiplexed CORESET is sent on a time-frequency resource position other than the time-frequency resource position of the synchronization signal block sent by the base station indicated in the second indication information.

In some embodiments of the present disclosure, determining the time-frequency resource position for data reception according to the multiplexing information and the synchronization indication information includes: (1) in a case that the synchronization indication information is the first indication information, and the multiplexing information indicates that the UE-specific CORESET and the other CORESET are multiplexed, and neither the UE-specific CORESET nor the other CORESET is multiplexed with the RMSI CORESET, performing the following: (a) determining, for the common PDSCH scheduled by the multiplexed CORESET, that the synchronization signal block sent by the base station indicated in the first indication information is the synchronization signal block actually sent by the base station, and determining that the common PDSCH scheduled by the multiplexed CORESET is sent on a time-frequency resource position other than the time-frequency resource position of the synchronization signal block sent by the base station indicated in the first indication information; or (b) determining, for the UE-specific PDSCH scheduled by the multiplexed CORESET, that the synchronization signal block sent by the base station indicated in the first indication information is the synchronization signal block actually sent by the base station, and determining that the UE-specific PDSCH scheduled by the multiplexed CORESET is sent on a time-frequency resource position other than the time-frequency resource position of the synchronization signal block sent by the base station indicated in the first indication information; or (2) in a case that the synchronization indication information includes the first indication information and the second indication information, and the multiplexing information indicates that the UE-specific CORESET and the other CORESET are multiplexed, and neither the UE-specific CORESET nor the other CORESET is multiplexed with the RMSI CORESET, performing the following: (c) determining, for the common PDSCH scheduled by the multiplexed CORESET, that the synchronization signal block sent by the base station indicated in the first indication information is the synchronization signal block actually sent by the base station, and determining that the common PDSCH scheduled by the multiplexed CORESET is sent on a time-frequency resource position other than the time-frequency resource position of the synchronization signal block sent by the base station indicated in the first indication information; or (d) determining, for the UE-specific PDSCH scheduled by the multiplexed CORESET, that the synchronization signal block sent by the base station indicated in the second indication information is the synchronization signal block actually sent by the base station, and determining that the UE-specific PDSCH scheduled by the multiplexed CORESET is sent on a time-frequency resource position other than the time-frequency resource position of the synchronization signal block sent by the base station indicated in the second indication information.

In a carrier aggregation scene, the secondary cell also sends a synchronization signal block, however, the terminal does not attempt access on the secondary cell and therefore does not read the synchronization signal block of the secondary cell. Thus, the information of the synchronization signal block actually sent cannot be obtained from the first indication information sent from the system information. Only the synchronization signal block sent by the primary cell is indicated by the first indication information. In a case that scheduling and transmission of downlink data occur between a terminal and the secondary cell, an error in the rate de-matching may occur because the information of the synchronization signal block actually sent by the secondary cell is not known. Thus, in some embodiments of the present disclosure, optionally, the method of processing synchronization indication information further includes: receiving third indication information sent by the base station through a radio resource control signaling, wherein the third indication information is used to indicate the synchronization signal block sent by the secondary cell.

In a case that the terminal needs to perform traffic transmission on time-frequency resources of the secondary cell, the terminal determines that the received information on a secondary cell carrier is sent on a time-frequency resource position on the secondary cell carrier other than a time-frequency resource position of a synchronization signal block sent by the secondary cell needed to be indicated by the third indication information.

Thus, the terminal can know the synchronization signal block sent by the secondary cell, and can correctly perform the rate de-matching in a case that scheduling and transmission of downlink data occur between the terminal and the secondary cell.

In some embodiments of the present disclosure, the method of processing synchronization indication information further includes: (1) in a case that the synchronization indication information is the first indication information and the third indication information sent by the base station to the terminal through the radio resource control signaling is not received, determining that the synchronization signal block sent by the secondary cell needed to be indicated by the third indication information is the same as the synchronization signal block sent by the base station indicated in the first indication information, determining that the received information on the secondary cell carrier is sent on a time-frequency resource position on the secondary cell carrier other than the time-frequency resource position of the synchronization signal block sent by the base station indicated in the first indication information; or (2) in a case that the synchronization indication information includes the first indication information and the second indication information, and the third indication information sent by the base station to the terminal through the radio resource control signaling is not received, determining that the synchronization signal block sent by the secondary cell needed to be indicated by the third indication information is the same as the synchronization signal block sent by the base station indicated in the second indication information, determining that the received information on the secondary cell carrier is sent on a time-frequency resource position on the secondary cell carrier other than the time-frequency resource position of the synchronization signal block sent by the base station indicated in the second indication information; or (3) determining, in a case that the third indication information sent by the base station to the terminal through the radio resource control signaling is not received, that the secondary cell does not send a synchronization signal block.

After the terminal receives the synchronization signal block, the terminal may measure the synchronization signal block and report a result of the measurement, and the base station performs a cell handover procedure or a cell reselection procedure according to the result of the measurement. In order to enable the terminal to obtain more accurate information of the synchronization signal block for performing measurement, in some embodiments of the present disclosure, optionally, the method of processing synchronization indication information further includes: receiving fourth indication information sent by the base station through a radio resource control signaling, wherein the fourth indication information is used to indicate a synchronization signal block needed to be measured by the terminal; measuring, within an SMTC measurement period, the synchronization signal block indicated in the fourth indication information.

That is, a synchronization signal block, within the SMTC measurement period, of synchronization signal blocks indicated in the fourth indication information, is measured, and a synchronization signal block, not within the SMTC measurement period, of the synchronization signal blocks indicated in the fourth indication information is not measured. Thus, the terminal is assisted to measure the synchronization signal block, and a time duration required for blind detection and measurement of the synchronization signal block is shortened, and energy of the terminal may be reduced.

In the embodiments of the present disclosure, the method may further include: (1) in a case that the synchronization indication information is the first indication information, and the fourth indication information sent by the base station to the terminal through a radio resource control signaling is not received, determining that a synchronization signal block needed to be measured by the terminal which needs to be indicated in the fourth indication information is the same as the synchronization signal block sent by the base station indicated in the first indication information, and, measuring the synchronization signal block indicated by the first indication information within a SMTC measurement period; or (2) in a case that the synchronization indication information includes the first indication information and the second indication information, and the fourth indication information sent by the base station to the terminal through the radio resource control signaling is not received, determining that the synchronization signal block needed to be measured by the terminal which needs to be indicated in the fourth indication information is the same as the synchronization signal block sent by the base station indicated in the second indication information, and, measuring the synchronization signal block indicated by the second indication information within a SMTC measurement period.

In the embodiments of the present disclosure, synchronization signal blocks sent by the base station indicated in the fourth indication information corresponding to different terminals and needed to be measured by the terminals may be the same or different.

In the embodiments of the present disclosure, the fourth indication information may indicate, in a full bitmap manner, the synchronization signal block needed to be measured by the terminal.

In the embodiments of the present disclosure, in a case that the fourth indication information is used for a serving cell (i.e., a corresponding SMTC is used for measuring the serving cell), the fourth indication information may be the same as or different from the second indication information, and may also be the same as or different from the third indication information. For example, in a case that a neighbor cell and a local cell measured by a corresponding SMTC are intra-frequency cells, the fourth indication information may be a union set of the second indication information of the local cell and the second indication information of the neighbor cell, or may be a subset of the union set; in a case that the neighbor cell and the local cell measured by the SMTC are inter-frequency cells, the fourth indication information may be the same as the second indication information or may be a subset of the second indication information.

In addition, in the embodiments of the present disclosure, if the base station does not configure the indication information to a terminal in a connected state, the terminal measures all synchronization signal blocks in the SMTC measurement period by default. For a terminal in an idle state, the base station does not configure the fourth indication information, and the terminal measures all synchronization signal blocks in the SMTC measurement period by default.

A synchronization signal block may also be used for radio link monitoring. In order to enable the terminal to obtain more accurate information of the synchronization signal block for the radio link monitoring, in some embodiments of the present disclosure, optionally, the method of processing synchronization indication information further includes: receiving fifth indication information sent by the base station through the radio resource control signaling, wherein the fifth indication information is used to indicate a synchronization signal block needed to be measured by the terminal and being used for the radio link monitoring; measuring the synchronization signal block indicated in the fifth indication information, and using the measurement for the radio link monitoring.

In the embodiments of the present disclosure, the method may further include: (1) in a case that the synchronization indication information is the first indication information and the fifth indication information sent by the base station to the terminal through the radio resource control signaling is not received, determining that the synchronization signal block needed to be measured by the terminal and being used for the radio link monitoring which needs to be indicated in the fifth indication information is the same as the synchronization signal block sent by the base station indicated in the first indication information, measuring the synchronization signal block indicated in the first indication information and using the measurement for the radio link monitoring; or (2) in a case that the synchronization indication information includes the first indication information and the second indication information, and the fifth indication information sent by the base station to the terminal through the radio resource control signaling is not received, determining that the synchronization signal block needed to be measured by the terminal and being used for the radio link monitoring which needs to be indicated in the fifth indication information is the same as the synchronization signal block sent by the base station indicated in the second indication information, measuring the synchronization signal block indicated in the second indication information and using the measurement for the radio link monitoring.

In some embodiments, the fifth indication information indicates, in a bitmap manner, the synchronization signal block needed to be measured and being used for the radio link monitoring; optionally, the fifth indication information indicates, in a full bitmap manner, the synchronization signal block needed to be measured and being used for the radio link monitoring, so that the indicated synchronization signal block needed to be measured and being used for the radio link monitoring is more accurate.

In some other embodiments, the fifth indication information indicates the number of synchronization signal blocks needed to be measured and used for radio link monitoring, e.g., indicates that synchronization signal blocks needed to be measured and being used for the radio link monitoring are the first two synchronization signal blocks of the synchronization signal blocks actually received, so as to reduce the number of bits occupied by the fifth indication information.

In some other embodiments, the fifth indication information indicates a time index of a synchronization signal block needed to be measured and used for radio link monitoring.

The method of indicating a synchronization signal block performed by the base station and the method of processing synchronization indication information performed by the terminal in the embodiments of the present disclosure will be described hereinafter with reference to specific embodiments.

Third Embodiment

Figure 3:
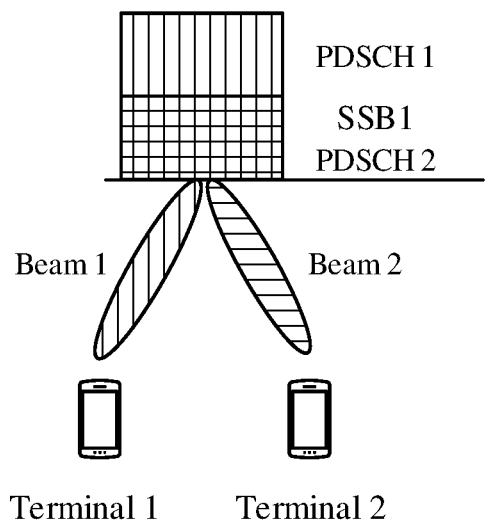
FIG. 3 is a schematic diagram of a space division multiplexing scenario according to a third and a fourth embodiments of the present disclosure.

Referring to FIG. 3, FIG. 3 is a schematic diagram of a space-division multiplexing scenario according to the third embodiment of the present disclosure. In this embodiment, the base station has a plurality of antenna panels, data may be sent through a beam 1 (Beam 1, such as a beam filled with vertical lines in FIG. 3), and a beam 2 (Beam 2, such as a beam filled with horizontal lines in FIG. 3). Beam1 covers a terminal 1 (UE1) and Beam2 covers a terminal 2 (UE2). A SSB1 broadcast by the base station and a PDSCH2 corresponding to UE2 use the same time-frequency resources (see a portion in FIG. 3 filled with grid lines), a PDSCH1 corresponding to the UE1 (such as a portion in FIG. 3 filled with vertical lines) and the broadcasted SSB1 use different frequency-domain resources and the same time-domain resources, i.e., frequency-division multiplexing (Frequency-Division Multiplexing (FDM, for short)). The base station broadcasts the synchronization signal block SSB1 and sends the PDSCH1 to the UE1 through the Beam1 covering the UE1, and sends the PDSCH2 to the UE2 through the Beam2 covering the UE2.

In the embodiments of the present disclosure, the base station may send first second indication information and second indication information to the UE1 and the UE2 respectively through RRC signalings, the first second indication information corresponding to the UE1 is used to indicate that the base station sends the SSB1 on a current time-frequency resource through the Beam1, and the second indication information corresponding to the UE2 indicates that the base station does not send a SSB on a current time-frequency resource through the Beam2.

The UE1 and the UE2 parse received RRC signalings, respectively. In the embodiments of the present disclosure, assuming that different types of CORESETs are not multiplexed, both the UE1 and the UE2 determine that the SSB sent by the base station indicated in the second indication information is the SSB actually sent by the base station, wherein, a UE1-specific RRC signaling (a RRC signaling sent to UE1) indicates that the base station sent the SSB 1 on a current resource through the Beam1, therefore, in a case that the UE1 determines that resource mapping is performed for the PDSCH1 on the resource, the UE1 will avoid a RE where the SSB 1 is located. A UE2-specific RRC signaling (a RRC signaling sent to the UE2) indicates that the base station does not send an SSB on a current resource through the Beam 2, therefore, in a case that the UE2 determines that resource mapping is performed for the PDSCH2 on the resource, the UE2 can occupy the RE used by the SSB 1.

Fourth Embodiment

Also referring to FIG. 3, in the embodiments of the present disclosure, the base station has a plurality of antenna panels, data may be sent through a beam 1 (Beam 1, such as a beam filled with vertical lines in FIG. 3), and a beam 2 (Beam 2, such as a beam filled with horizontal lines in FIG.

3). Beam1 covers a terminal 1 (UE1) and Beam2 covers a terminal 2 (UE2). A synchronization signal block 1 (SSB1) broadcast by the base station and a PDSCH2 corresponding to the UE2 use the same time-frequency resources (see a portion in FIG. 3 filled with grid lines), a PDSCH1 corresponding to the UE1 (such as a portion in FIG. 3 filled with vertical lines) and the broadcasted SSB1 use different frequency-domain resources and the same time-domain resources, i.e., frequency-division multiplexing (Frequency-Division Multiplexing (FDM, for short)). The base station broadcasts the synchronization signal block 1 (SSB1) and sends the PDSCH1 to the UE1 through the Beam1 covering the UE1, and sends the PDSCH2 to the UE2 through the Beam2 covering the UE2.

In the embodiments of the present disclosure, the base station may send first second indication information and second indication information to the UE1 and the UE2 respectively through RRC signalings, both the first second indication information corresponding to the UE1 and the second indication information corresponding to the UE 2 are used to indicate information of the SSB 1 sent by the base station on a current time-frequency resource.

The UE1 and the UE2 parse received RRC signalings, respectively. In the embodiments of the present disclosure, assuming that different types of CORESETs are not multiplexed, both the UE1 and the UE2 determine that the SSB sent by the base station indicated in the second indication information is the SSB actually sent by the base station, wherein, a UE1-specific RRC signaling indicates that the base station sent the SSB1 on a current resource therefore, in a case that the UE1 determines that resource mapping is performed for the PDSCH1 on the resource, the UE1 will avoid a RE where the SSB1 is located. A UE2-specific RRC signaling indicates that the base station sends an SSB on a current resource, therefore, in a case that the UE2 determines that resource mapping is performed for the PDSCH2 on the resource, the UE2 can avoid the RE used by the SSB1.

Fifth Embodiment

In the embodiments of the present disclosure, the base station may additionally send some SSBs temporarily for some purpose. In such a case, the number of SSBs sent by the base station indicated in the system information may be less than the number of SSBs actually sent by the base station. The base station needs to inform the terminal of information of the SSBs sent additionally.

In the embodiments of the present disclosure, the base station sends the second indication information to the terminal through an RRC signaling, wherein the second indication information includes the information sent additionally by the base station.

In the embodiments of the present disclosure, assuming that different types of CORESETs are not multiplexed, the terminal determines that the SSB sent by the base station indicated in the second indication information is the SSB actually sent by the base station, and in a case that resource mapping is performed for the UE-specific PDSCH/CORESET on the resource, the terminal may avoid the RE where the SSB actually sent is located.

Sixth Embodiment

In this embodiment, in the carrier aggregation scene, the base station sends the first indication information through the system information, and only the synchronization signal block sent by the primary cell is indicated in the first indication information, and the primary cell does not send the second indication information or the third indication information to the terminal through the RRC signaling.

The terminal parses the RRC signaling and finds that the base station does not send the second indication information or the third indication information. The terminal determines that the SSB sent by the primary cell indicated by the first indication information is the SSB actually sent by the primary cell, and determines that the SSB actually sent by the secondary cell is the same as the SSB actually sent by the primary cell, and determines that in a case that resource mapping is performed for the UE-specific PDSCH and the CORESET on resources of the secondary cell, an RE where the SSB actually sent by the secondary cell is located will be avoided.

Seventh Embodiment

In this embodiment, in the carrier aggregation scene, the base station sends the first indication information through the system information, and only the synchronization signal block sent by the primary cell is indicated in the first indication information.

The base station sends the second indication information to the terminal through the RRC signaling, but does not send the third indication information.

The terminal parses the RRC signaling to obtain the second indication information and finds that the base station does not configure the third indication information. The terminal determines that the SSB sent by the primary cell indicated by the second indication information is the SSB actually sent by the primary cell, and determining that the SSB actually sent by the secondary cell is the same as the SSB actually sent by the primary cell, and determines that in a case that resource mapping is performed for the UE-specific PDSCH and CORESET on resources of the secondary cell resources, the RE where the SSB actually sent by the secondary cell is located will be avoided.

Eighth Embodiment

In this embodiment, in the carrier aggregation scenario, the base station sends the first indication information through the system information, and only the synchronization signal block sent by the primary cell is indicated in the first indication information.

The base station sends the second indication information to the terminal through the RRC signaling, but does not send the third indication information.

The terminal parses the RRC signaling to obtain the second indication information and finds that the base station does not configure the third indication information. The terminal determines that the SSB sent by the primary cell indicated by the second indication information is the SSB actually sent by the primary cell, and determines that the secondary cell does not send an SSB, and determines that in a case that resource mapping is performed for the UE-specific PDSCH and the CORESET on resources of the secondary cell, an SSB actually sent by the secondary cell is not taken into consideration.

Ninth Embodiment

In this embodiment, in the carrier aggregation scenario, the information of the SSB sent by the secondary cell also needs to be indicated to the terminal, so as to help the terminal to perform the rate de-matching.

A specific method is as follows: the base station sends third indication information to the terminal through an RRC signaling, and the third indication information is used for indicating the information of the SSB sent by the secondary cell.

The terminal parses the RRC signaling to obtain the third indication information, and determines that the SSB sent by the secondary cell indicated in the third indication information is actually sent, and the terminal determines that in a case that resource mapping is performed for the UE-specific PDSCH and the CORESET on resources of the secondary cell, the RE in which the SSB actually sent by the secondary cell will be avoided.

Tenth Embodiment

Figure 4:
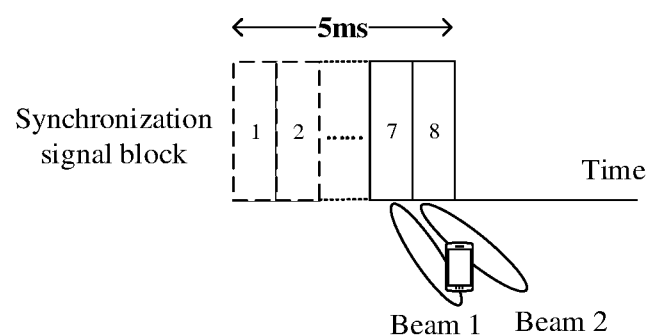
FIG. 4 is a schematic diagram of an application scenario according to a tenth embodiment of the present disclosure.

Referring to FIG. 4, in the embodiments of the present disclosure, a carrier frequency of the base station is in a range of 3 GHz to 6 GHz. In such a case, at most 8 synchronization signal blocks (SSBs) are sent in one SS burst set period, the base station actually sends the SSBs through two beams (beam 1 and beam 2), the beam1 corresponds to the SSB7, the beam2 corresponds to the SSB8, and both the beam 1 and the beam 2 may cover the terminal.

The base station configures an SMTC to the terminal for measurement of the primary cell, and sends the second indication information and the fourth indication information to the terminal through an RRC signaling, wherein the second indication information is 00000011 indicating that the base station sends an SSB7 and an SSB8; the fourth indication information is 00000011 indicating that the terminal needs to measure the SSB7 and the SSB8.

The terminal parses the RRC signaling. Because indication of the second indication information is 00000011, the terminal determines that the base station has sent only the SSB7 and the SSB8. Because indication of the fourth indication information is 00000011, the terminal determines that only the SSB7 and the SSB8 need measurement, and performs radio resource measurement according to the instruction.

Eleventh Embodiment

Figure 5:
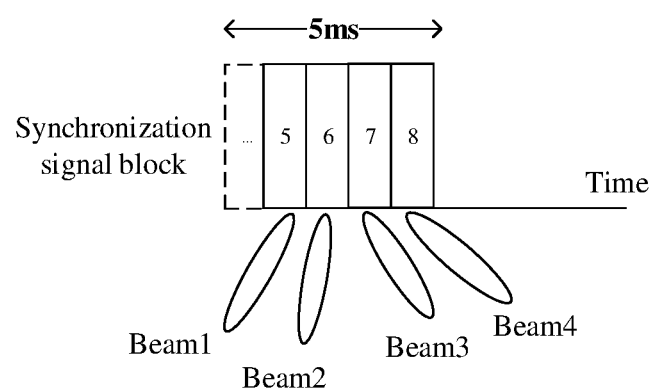
FIG. 5 is a schematic diagram of an application scenario according to an eleventh to a fourteenth embodiments of the present disclosure.

Referring to FIG. 5, in the embodiments of the present disclosure, a carrier frequency of the base station is in a range of 3 GHz to 6 GHz. In such a case, at most 8 synchronization signal blocks (SSBs) are sent in one SS burst set period, the base station actually sends the SSBs through four beams (beam 1, beam 2, beam 3, and beam 4), the beam 1 corresponds to the SSB5, the beam2 corresponds to the SSB6, the beam3 corresponds to the SSB7, and the beam4 corresponds to the SSB8.

The base station configures the SMTC to the terminal for measurement of the secondary cell, and sends the third indication information and the fourth indication information to the terminal through an RRC signaling, wherein the third indication information is 00001111 indicating that the base station sends the SSB5, the SSB6, the SSB7 and the SSB8, the fourth indication information is 00001111 indicating that the terminal needs to measure the SSB5, the SSB6, the SSB7, and the SSB8.

The terminal parses the RRC signaling. Because indication of the third indication information is 00001111, the terminal determines that the secondary cell sends the SSB5, the SSB6, the SSB7, and the SSB8. Because indication of the fourth indication information is 00001111, the terminal determines that the SSB5, the SSB6, the SSB7, and the SSB8 sent by the secondary cell need to be measured, and performs radio resource measurement according to the instruction.

Twelfth Embodiment

Referring to FIG. 5, in the embodiments of the present disclosure, the carrier frequency of the base station is in the range of 3 GHz to 6 GHz. In such a case, at most 8 SSBs are sent in one SS burst set period, and the base station actually sends the SSBs through 4 beams (beam 1, beam2, beam3, and beam4), wherein the beam1 corresponds to the SSB5, the beam2 corresponds to the SSB6, the beam3 corresponds to the SSB7, and the beam4 corresponds to the SSB8.

The base station sends the second indication information and the fifth indication information to the terminal through an RRC signaling, wherein the second indication information is 00001111 indicating that the base station sends the SSB5, the SSB6, the SSB7 and the SSB8; the fifth indication information is 00001111 indicating that the terminal needs to measure the SSB5, the SSB6, the SSB7, and the SSB8, so as to monitor corresponding wireless links.

The terminal parses the RRC signaling. Because indication of the second indication information is 00001111, the terminal determines that the base station sends the SSB5, the SSB6, the SSB7, and the SSB8. Because indication of the fifth indication information is 00001111, the terminal determines that the SSB5, the SSB6, the SSB7 and the SSB8 sent by the base station need to be measured, and monitors wireless links according to the instruction and reports a monitoring result.

Thirteenth Embodiment

Referring to FIG. 5, in the embodiments of the present disclosure, the carrier frequency of the base station is in the range of 3 GHz to 6 GHz. In such a case, at most 8 SSBs are sent in one SS burst set period, and the base station actually sends the SSBs through 4 beams (beam 1, beam2, beam3, and beam4), wherein the beam1 corresponds to the SSB5, the beam2 corresponds to the SSB6, the beam3 corresponds to the SSB7, and the beam4 corresponds to the SSB8.

The base station sends the second indication information and the fifth indication information to the terminal through an RRC signaling, wherein the second indication information is 00001111 indicating that the base station sends the SSB5, the SSB6, the SSB7 and the SSB8; the fifth indication information is 00000011 indicating that the terminal needs to measure the SSB7 and the SSB8, so as to monitor corresponding wireless links.

The terminal parses the RRC signaling. Because indication of the second indication information is 00001111, the terminal determines that the base station sends the SSB5, the SSB6, the SSB7, and the SSB8. Because indication of the fifth indication information is 00000011, the terminal determines that the SSB7 and the SSB8 sent by the base station need to be measured, and monitors wireless links according to the instruction and reports a monitoring result.

Fourteenth Embodiment

Referring to FIG. 5, in the embodiments of the present disclosure, the carrier frequency of the base station is in the range of 3 GHz to 6 GHz. In such a case, at most 8 SSBs are sent in one SS burst set period, and the base station actually sends the SSBs through 4 beams (beam1, beam2, beam3, and beam4), wherein the beam1 corresponds to the SSB5, the beam2 corresponds to the SSB6, the beam3 corresponds to the SSB7, and the beam4 corresponds to the SSB8.

The base station sends the second indication information and the fifth indication information to the terminal through an RRC signaling, wherein the second indication information is 00001111 indicating that the base station sends the SSB5, the SSB6, the SSB7 and the SSB8; indication of the fifth indication information is 2 indicating that the terminal needs to measure the first two of SSBs actually sent, i.e., the SSB5 and the SSB6, so as to monitor corresponding wireless links.

The terminal parses the RRC signaling. Because indication of the second indication information is 00001111, the terminal determines that the base station sends the SSB5, the SSB6, the SSB7, and the SSB8. Because indication of the fifth indication information is 2, the terminal determines that the SSB5 and the SSB6 sent by the base station need to be measured, and monitors wireless links according to the instruction and reports a monitoring result.

Fifteenth Embodiment

Figure 6:
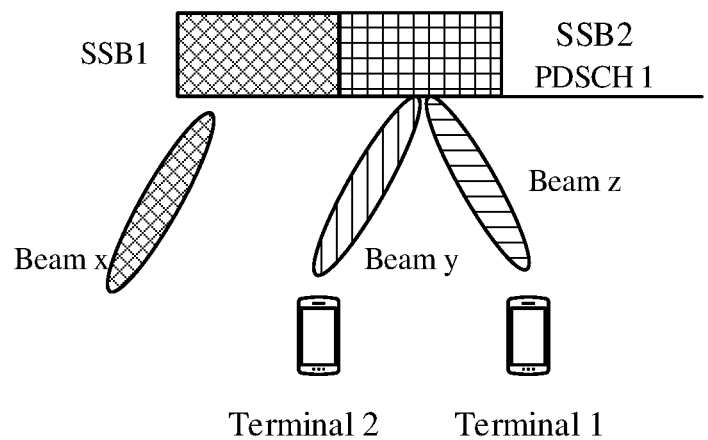
FIG. 6 is a schematic diagram of an application scenario according to a fifteenth embodiment of the present disclosure.

Referring to FIG. 6, in the embodiments of the present disclosure, the base station sends a synchronization signal block 1 (SSB1) through a beam x, and sends a synchronization signal block 2 (SSB2) through a beam y. The base station sends first indication information 11000000 through an RMSI, i.e., instructing that the base station sends the SSB1 and the SSB2. The terminal reads the RMSI in a case of accessing a cell to obtain the first indication information.

The base station sends a UE1-specific CORESET to a terminal 1 (UE1) through an RRC signaling, and a UE1-specific PDSCH (denoted as PDSCH1) is scheduled by the UE1-specific CORESET, and time-frequency domain positions of the PDSCH1 and an SSB2 overlap. In such a case, the SSB2 and the PDSCH1 may be space-division multiplexed, for example, the SSB2 and the PDSCH1 are sent by using different beams. The base station send the SSB2 to a terminal 2 (UE2) through a beam y. It is assumed that the base station sends the PDSCH1 and the UE1-specific CORESET through a beam z. It is assumed that the UE1-specific CORESET is multiplexed with the RMSI CORESET, and is not multiplexed with other CORESETs. The base station sends the second indication information 10110000 to the UE1 through an RRC signaling, i.e., indicating that the base station sends the SSB1, the SSB3, and the SSB4.

The terminal parses the RRC signaling and finds the second indication information is 10110000. The terminal receives the UE1-specific CORESET, and finds that the UE1-specific CORESET is multiplexed with the RMSI CORESET. Therefore, the terminal considers, in conjunction with the second indication information, that the base station sends the SSB1, the SSB3, and the SSB4. The terminal receives, according to the UE1-specific CORESET, the PDSCH1 at a time-frequency resource where the SSB2 is located.

Sixteenth Embodiment

The base station broadcasts the RMSI and a certain OSI, schedules a CORESET of the broadcasted OSI to be multiplexed with the RMSI CORESET, and not to be multiplexed with the UE-specific CORESET. The base station sends, through the RMSI, the first indication information indicating 11110000, i.e., indicating that the base station sends the SSB1, the SSB2, the SSB3, and the SSB4. The time-frequency resource of the SSB4 overlaps with a time-frequency resource of the multiplexed CORESET.

The terminal parses the RMSI, obtains the first indication information as 11110000, and obtains configuration information of an OSI CORESET through the RMSI, and finds that the OSI CORESET is multiplexed with the RMSI CORESET, but is not multiplexed with the UE-specific CORESET. The terminal determines that the time-frequency resources where the SSB4 and the multiplexed CORESET overlap are used to send the multiplexed CORESET.

Seventh Embodiment

The base station broadcasts the RMSI and a certain OSI, schedules a CORESET of the broadcasted OSI to be multiplexed with the RMSI CORESET, and not to be multiplexed with the UE-specific CORESET. The base station sends, through the RMSI, the first indication information indicating 11110000, i.e., indicating that the base station sends the SSB1, the SSB2, the SSB3, and the SSB4. The time-frequency resource of the SSB4 overlaps with the time-frequency resource of an OSI PDSCH scheduled by the multiplexed CORESET.

The terminal parses the RMSI, obtains the first indication information as 11110000, and obtains configuration information of an OSI CORESET through the RMSI, and finds that the OSI CORESET is multiplexed with the RMSI CORESET, but is not multiplexed with the UE-specific CORESET. The terminal determines that the time-frequency resources where the SSB4 and the OSI PDSCH scheduled by the multiplexed CORESET overlap are used to send the OSI PDSCH scheduled by the multiplexed CORESET.

Eighteenth Embodiment

The base station broadcasts the RMSI and sends the UE-specific CORESET and the UE-specific PDSCH to a certain terminal. The UE-specific CORESET and the RMSI CORESET are multiplexed are multiplexed, but is not multiplexed with an other CORESET. The base station sends, through the RMSI, the first indication information indicating 11111000, i.e., indicating that the base station has sent the SSB1, the SSB2, the SSB3, the SSB4, and the SSB5. The terminal reads the RMSI in a case of accessing a cell to obtain the first indication information. The base station sends, through an RRC, the second indication information indicating 11111000, i.e., indicating that the base station sends the SSB1, the SSB2, the SSB3, the SSB4, and the SSB5. The time-frequency resources of the SSB4 overlap with time-frequency resources of the multiplexed CORESET.

A terminal in a connected state parses the RRC, obtains the second indication information as 11111000, and obtains a configuration of the UE-specific CORESET. The terminal finds that the UE-specific CORESET and the RMSI CORESET are multiplexed, but is not multiplexed with other CORESETs. The terminal determines that time-frequency resources where the SSB4 overlaps with the multiplexed CORESET are used to send the multiplexed CORESET.

Nineteenth Embodiment

The base station broadcasts the RMSI and sends the UE-specific CORESET and the UE-specific PDSCH to a certain terminal. The UE-specific CORESET and the RMSI CORESET are multiplexed, but is not multiplexed with an other CORESET. The base station sends, through the RMSI, the first indication information indicating 11110000, i.e., indicating that the base station sends the SSB1, the SSB2, the SSB3, and the SSB4. The terminal reads the RMSI in a case of accessing the cell, to obtain the first indication information. The base station sends, through a RRC, the second indication information indicating 11111000, i.e., indicating that the base station sends the SSB1, the SSB2, the SSB3, the SSB4, and the SSB5. Time-frequency resources of the SSB4 overlap with time-frequency resources of a common PDSCH scheduled by the other CORESET, time-frequency resources of the SSB5 overlap with time-frequency resources of the UE-specific PDSCH scheduled by the multiplexed CORESET.

A terminal in a connected state parses the RRC, obtains the second indication information as 11111000, and obtains configuration of the UE-specific CORESET. The terminal finds that the UE-specific CORESET and the RMSI CORESET are multiplexed, but is not multiplexed with an other CORESET. For the common PDSCH scheduled by the other CORESET, the terminal considers that time-frequency resources where the SSB4 overlaps with a common PDSCH scheduled by an other CORESET are used to send the common PDSCH scheduled by an other CORESET. For a UE-specific PDSCH scheduled by the multiplexed CORESET, it is determined, in combination with the second indication information, that the SSB5 is actually sent, and time-frequency resources where the SSB5 overlaps with the UE-specific PDSCH scheduled by the multiplexed CORESET are not used to send the UE-specific PDSCH.

Twentieth Embodiment

The base station broadcasts the RMSI and the OSI, and sends the UE-specific CORESET and the UE-specific PDSCH to a certain terminal, so as to schedule the UE-specific CORESET to be multiplexed with an OSI CORESET, but is not multiplexed with an RMSI CORESET. The base station sends, through an RMSI, the first indication information indicating 11110000, i.e., indicating that the base station sends the SSB1, the SSB2, the SSB3, and the SSB4. The terminal reads the RMSI in a case of accessing the cell, to obtain the first indication information and configuration of the OSI CORESET. The base station sends, through a RRC, the second indication information indicating 11100000, i.e., indicating that the base station sends the SSB1, the SSB2, and the SSB3. Time-frequency resources of the SSB4 overlap with time-frequency resources of the multiplexed CORESET.

A terminal in a connected state parses the RRC, obtains the second indication information as 11100000, and obtains configuration of the UE-specific CORESET. The terminal finds that the UE-specific CORESET is multiplexed with the OSI CORESET, but is not multiplexed with the RMSI CORESET. The terminal determines, in combination with the first indication information obtained at an access phase, that the base station sends the SIB 1/2/3/4, and time-frequency resources where the SSB4 overlaps with the multiplexed CORESET are not used to send the multiplexed CORESET.

Twenty-First Embodiment

The base station broadcasts the RMSI and the OSI, and sends the UE-specific CORESET and the UE-specific PDSCH to a certain terminal. The UE-specific CORESET is multiplexed with an OSI CORESET, but is not multiplexed with an RMSI CORESET. The base station sends, through an RMSI, the first indication information indicating 11110000, i.e., indicating that the base station sends the SSB1, the SSB2, the SSB3, and the SSB4. The terminal reads the RMSI in a case of accessing the cell, to obtain the first indication information. The base station sends, through a RRC, the second indication information indicating 11111000, i.e., indicating that the base station sends the SSB1, the SSB2, the SSB3, the SSB4 and the SSB5. Time-frequency resources of the SSB4 overlap with time-frequency resources of a common PDSCH scheduled by the multiplexed CORESET, and time-frequency resources of the SSB5 overlap with time-frequency resources of the UE-specific PDSCH scheduled by the multiplexed CORESET.

A terminal in a connected state parses the RRC, obtains the second indication information as 11111000, and obtains configuration of the UE-specific CORESET. The terminal finds that the CORESET is multiplexed with the OSI CORESET, but is not multiplexed with the RMSI CORESET. For the common PDSCH scheduled by the multiplexed CORESET, the terminal determines, in combination with the first indication information obtained at an access phase, that the SSB4 is actually sent, and time-frequency resources where the SSB4 overlaps with a common PDSCH scheduled by the multiplexed CORESET are not used to send the common PDSCH scheduled by the multiplexed CORESET. For the UE-specific PDSCH scheduled by the multiplexed CORESET, the terminal determines, in combination with the second indication information, that the SSB5 is actually sent, and time-frequency resources where the SSB5 overlaps with the UE-specific PDSCH scheduled by the multiplexed CORESET are not used to send the UE-specific PDSCH.

Twenty-Second Embodiment

The base station broadcasts the RMSI and the OSI, and sends the UE-specific CORESET and the UE-specific PDSCH to a certain terminal. The UE-specific CORESET is multiplexed with an OSI CORESET, and is multiplexed with an RMSI CORESET. The base station sends, through an RMSI, the first indication information indicating 11110000, i.e., indicating that the base station sends the SSB1, the SSB2, the SSB3, and the SSB4. The terminal reads the RMSI in a case of accessing the cell, to obtain the first indication information and configuration of the OSI CORESET. The base station sends, through a RRC, the second indication information indicating 11110000, i.e., indicating that the base station sends the SSB1, the SSB2, the SSB3, and the SSB4. Time-frequency resources of the SSB4 overlap with time-frequency resources of the multiplexed CORESET.

A terminal in a connected state parses the RRC, obtains the second indication information as 11110000, and obtains configuration of the UE-specific CORESET. The terminal finds that the US-specific CORESET is multiplexed with the OSI CORESET, and is multiplexed with the RMSI CORESET. The terminal determines that time-frequency resources where the SSB4 overlaps with the multiplexed CORESET are used to send the multiplexed CORESET.

Twenty-Third Embodiment

The base station broadcasts the RMSI and the OSI, and sends the UE-specific CORESET and the UE-specific PDSCH to a certain terminal. The UE-specific CORESET is multiplexed with an OSI CORESET, and is multiplexed with an RMSI CORESET. The base station sends, through an RMSI, the first indication information indicating 11110000, i.e., indicating that the base station sends the SSB1, the SSB2, the SSB3, and the SSB4. The terminal reads the RMSI in a case of accessing the cell, to obtain the first indication information. The base station sends, through a RRC, the second indication information indicating 11111000, i.e., indicating that the base station sends the SSB1, the SSB2, the SSB3, the SSB4 and the SSB5. Time-frequency resources of the SSB4 overlap with time-frequency resources of a common PDSCH scheduled by the multiplexed CORESET, and time-frequency resources of the SSB5 overlap with time-frequency resources of the UE-specific PDSCH scheduled by the multiplexed CORESET.

A terminal in a connected state parses the RRC, obtains the second indication information as 11111000, and obtains configuration of the UE-specific CORESET. The terminal finds that the UE-specific CORESET, the OSI CORESET, and the RMSI CORESET are multiplexed. For the common PDSCH scheduled by the multiplexed CORESET, the terminal considers that time-frequency resources where the SSB4 overlaps with a common PDSCH scheduled by the multiplexed CORESET are used to send the common PDSCH scheduled by the multiplexed CORESET. For the UE-specific PDSCH scheduled by the multiplexed CORESET, the terminal determines, in combination with the second indication information, that the SSB5 is actually sent, and time-frequency resources where the SSB5 overlaps with the UE-specific PDSCH scheduled by the multiplexed CORESET are not used to send the UE-specific PDSCH.

Twenty-Fourth Embodiment

Figure 7:
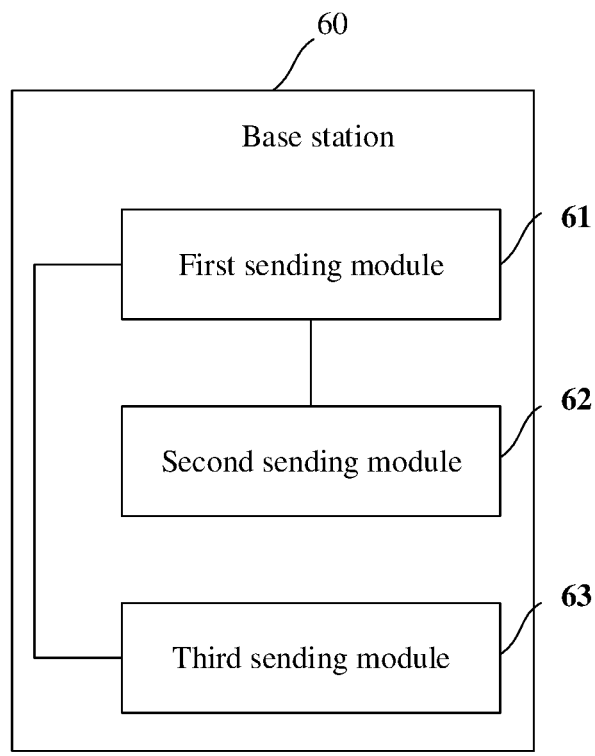
FIG. 7 is a structural schematic diagram of a base station according to a twenty-fourth embodiment of the present disclosure.

Based on the same inventive concept, referring to FIG. 7, the twenty-fourth embodiment of the present disclosure further provides a base station 60. The base station includes a first sending module 61 and a second sending module 62.

The first sending module 61 is used to send a synchronization signal block; a first sending module 61 sends the synchronization signal block in a broadcast manner.

The second sending module 62 is used to send synchronization indication information, wherein the synchronization indication information is used to indicate the synchronization signal block sent by the base station, the synchronization indication information is first indication information, or the synchronization indication information includes the first indication information and second indication information, the first indication information is sent by the base station through system information and the second indication information is sent by the base station through a Radio Resource Control (RRC) signaling.

The first sending module 61 and the second sending module 62 may be independent modules, and may be implemented as one module.

In the embodiments of the present disclosure, optionally, the system information may be remaining minimum system information (Remaining Minimum System Information (RMSI, for short)). Of course, in some other embodiments of the present disclosure, it is also not excluded that the first indication information is sent by using other system information.

In the embodiments of the present disclosure, synchronization signal blocks sent by the base station indicated in second indication information corresponding to different terminals are the same or different.

In the embodiments of the present disclosure, the base station sends the synchronization indication information to a terminal to enable the terminal to perform a corresponding operation according to a synchronization signal block sent by the base station indicated in the synchronization indication information.

For example, the corresponding operation may include at least one of following: determining a time-frequency resource position for data reception; measuring the synchronization signal block; measuring the synchronization signal block, and using the synchronization signal block for radio link monitoring; and the like.

The received information may include at least one of an RMSI CORESET, an RMSI Physical Downlink Shared Channel (PDSCH), a User Equipment (UE)-specific CORESET, a UE-specific PDSCH, a Common PDSCH and an other CORESET.

The other CORESET is a CORESET different from the RMSI CORESET and the UE-specific CORESET; or the other CORESET is a CORESET other than the RMSI CORESET and the UE-specific CORESET, for example, a CORESET of a Random Access Channel (RACH) message, a CORESET of a broadcasted OSI, a CORESET of a Paging, etc.

The common PDSCH is a PDSCH different from the RMSI PDSCH and the UE-specific PDSCH; or the common PDSCH is a PDSCH other than the RMSI PDSCH and the UE-specific PDSCH, for example, a PDSCH of the RACH message, a PDSCH of the broadcasted OSI, a PDSCH of the Paging, and the like.

The RACH message includes a Random Access Response (RAR, i.e., Msg2) and contention resolution (Contention Resolution, i.e., Msg4) in a RACH procedure.

The PDSCH is a Physical Downlink Shared Channel. The UE-specific PDSCH is a PDSCH specific to a terminal.

The UE-specific PDSCH refers to the use of a terminal-specific PDSCH.

In the embodiments of the present disclosure, the base station sends synchronization indication information to the terminal, so as to assist the terminal in obtaining the correct synchronization signal block actually sent by the base station, thereby enabling the terminal to correctly determine the time-frequency resource position for data reception, measurement or radio link monitoring, etc.

In the embodiments of the present disclosure, optionally, the second indication information may indicate, in a full bitmap (Full bitmap) manner, the synchronization signal block sent by the base station. That is, in a case that a SS burst set can contain at most L synchronization signal blocks (L=4/8/64), a bitmap having a length L is used to indicate which synchronization signal blocks are actually sent. For example, in a frequency band in a carrier frequency range of above 6 GHz, a 64-bit bitmap may be used to indicate a synchronization signal block sent by the base station. Since the second indication information indicates, in the full bitmap manner, the synchronization signal block sent by the base station, such indication is more accurate, and accordingly, such a circumstance is reduced that information of the synchronization signal block indicated by the base station through the RMSI is inaccurate, and thus such problems are addressed that the terminal is caused to also attempt to search and detect some undetectable synchronization signal blocks and unnecessary power consumption is generated, or the terminal is caused to not search or detect some actually sent synchronization signal blocks, leading to inaccurate measurement results, incorrect link monitoring results, or inability to guarantee the terminal to perform correct rate de-matching and reception of PDSCH/CORESET.

The synchronization signal block and a terminal-dedicated PDSCH/CORESET may be sent on the same time-frequency resource. In such a case, the base station may perform space-division multiplexing on the synchronization signal block and the terminal-dedicated PDSCH/CORESET, and the synchronization signal block and the terminal-dedicated PDSCH/CORESET that are space-division-multiplexed are sent through different beams, thereby reducing mutual interference. In such a case, the terminal needs to know information of the synchronization signal block actually sent by the base station, so as to ensure that the terminal and the base station have consistent understanding of a manner in which the base station performs the rate-matching.

Thus, in some optional embodiments of the present disclosure, the first sending module 61 is used to send the second indication information (such as first second indication information and second indication information) to the first terminal and the second terminal through a radio resource control signaling, wherein the first second indication information corresponding to the first terminal indicates the synchronization signal block sent by the base station through the first beam on a current time-frequency resource, the second indication information corresponding to the second terminal indicates that the base station does not send the synchronization signal block through the second beam on the current time-frequency resource; or, both the first second indication information corresponding to the first terminal and the second indication information corresponding to the second terminal indicate the synchronization signal block sent by the base station on the current time-frequency resource.

In the embodiments of the present disclosure, in a case that the synchronization signal block and the terminal-specific PDSCH/CORESET are sent on the same time-frequency resources and are space-division-multiplexed, the second indication information can more accurately indicate, to the terminal, the synchronization signal block sent by the base station on the current time-frequency resource so as to avoid the problem that the terminal cannot obtain the synchronization signal block actually sent by the base station, and an error in the rate de-matching at the terminal is caused.

In the carrier aggregation scenario, the secondary cell may also send a synchronization signal block, however, the terminal does not attempt access on the secondary cell and therefore does not read the synchronization signal block of the secondary cell. Thus, the terminal cannot acquire, through system information, information of the synchronization signal block actually sent. In a case that scheduling and transmission of downlink data occur between a terminal and a secondary cell, an error in the rate de-matching may occur because information of synchronization signal blocks actually sent by the secondary cell is not known by the terminal. Thus, in some embodiments of the present disclosure, optionally, the base station further includes: a third sending module, used to send third indication information to the terminal through a radio resource control signaling, wherein the third indication information is used to indicate the synchronization signal block sent by the secondary cell.

Thus, the terminal can know the synchronization signal block sent by the secondary cell, and can correctly perform the rate de-matching in a case that scheduling and transmission of downlink data occur between the terminal and the secondary cell.

After the terminal receives the synchronization signal block, the terminal may measure the synchronization signal block and report a result of the measurement, and the base station performs a cell handover procedure or a cell reselection procedure according to the result of the measurement. In order to enable the terminal to obtain more accurate information of the synchronization signal block for performing measurement, in some embodiments of the present disclosure, optionally, the base station further includes: a fourth sending module, used to send fourth indication information to the terminal through a radio resource control signaling, wherein the fourth indication information is used to indicate a synchronization signal block needed to be measured by the terminal. Accordingly, the terminal is assisted to measure the synchronization signal block, and a time duration required for blind detection and measurement of the synchronization signal block is shortened, and energy of the terminal may be reduced.

In the embodiments of the present disclosure, synchronization signal blocks, sent by the base station indicated in the fourth indication information corresponding to different terminals, that the terminals need to measure during the SMTC measurement period may be the same or different.

In the embodiments of the present disclosure, the fourth indication information may indicate, in a full bitmap manner, the synchronization signal block needed to be measured by the terminal.

In the embodiments of the present disclosure, in a case that the fourth indication information is used for a serving cell (i.e., a corresponding SMTC is used for measuring the serving cell), the fourth indication information may be the same as or different from the second indication information, and may also be the same as or different from the third indication information. For example, in a case that a neighbor cell and a local cell measured by a corresponding SMTC are intra-frequency cells, the fourth indication information may be a union set of the second indication information of the local cell and the second indication information of the neighbor cell, or may be a subset of the union set; in a case that the neighbor cell and the local cell measured by the SMTC are inter-frequency cells, the fourth indication information may be the same as the second indication information or may be a subset of the second indication information.

In addition, in the embodiments of the present disclosure, if the base station does not configure the indication information to a terminal in a connected state, the terminal measures all synchronization signal blocks in the SMTC measurement period by default. For a terminal in an idle state, the base station does not configure the fourth indication information, and the terminal measures all synchronization signal blocks in the SMTC measurement period by default.

A synchronization signal block may also be used for radio link monitoring (RLM). In order to enable the terminal to obtain more accurate information of the synchronization signal block for the radio link monitoring, in some embodiments of the present disclosure, optionally, the base station further includes: a fifth sending module, used to send fifth indication information to the terminal through a radio resource control signaling, wherein the fifth indication information is used to indicate a synchronization signal block needed to be measured by the terminal and being used for the radio link monitoring.

In some embodiments, the fifth indication information indicates, in a bitmap manner, the synchronization signal block needed to be measured and being used for the radio link monitoring; optionally the fifth indication information indicates, in a full bitmap manner, the synchronization signal block needed to be measured and being used for the radio link monitoring, so that the indicated synchronization signal block needed to be measured and being used for the radio link monitoring is more accurate.

In some other embodiments, the fifth indication information indicates the number of synchronization signal blocks needed to be measured and used for radio link monitoring, e.g., indicates that synchronization signal blocks needed to be measured and being used for the radio link monitoring are the first two synchronization signal blocks of the synchronization signal blocks actually received, so as to reduce the number of bits occupied by the fifth indication information.

In some other embodiments, the fifth indication information indicates a time index of a synchronization signal block needed to be measured and used for radio link monitoring.

The base station in the embodiments of the present disclosure may be a base station (Base Transceiver Station (BTS, for short) in a Global System of Mobile Communication (GSM) or a Code Division Multiple Access (CDMA), or may be a base station (NodeB (NB, for short)) in a Wideband Code Division Multiple Access (WCDMA), or may be an Evolutional Node B (eNB or eNodeB, or short), a relay station or an access point in a Long Term Evolution (LTE), or may be a base station in a 5G network in the future, etc. The present disclosure is not limited thereto.

Twenty-Fifth Embodiment

Figure 8:
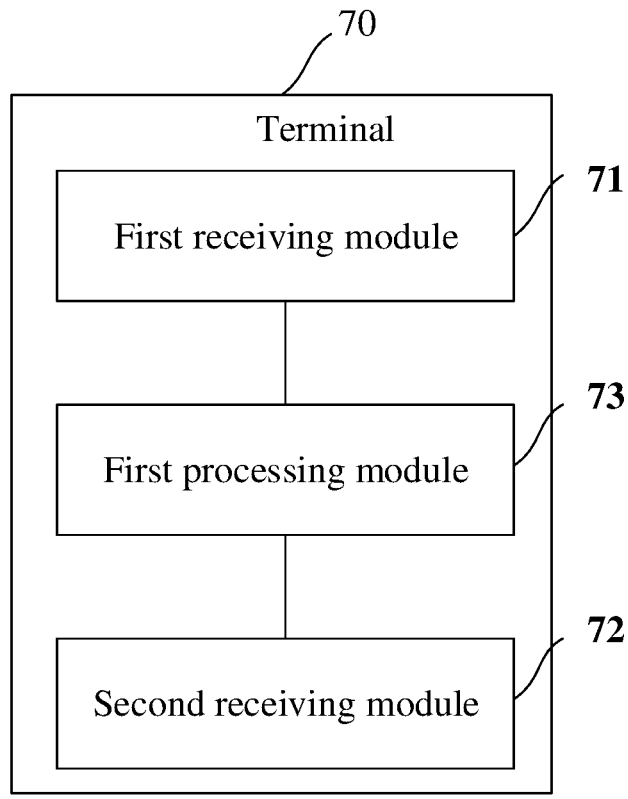
FIG. 8 is a structural schematic diagram of a terminal according to a twenty-fifth embodiment of the present disclosure.

Referring to FIG. 8, the twenty-fifth embodiment of the present disclosure further provides a terminal 70. The terminal includes a first receiving module 71, a second receiving module 72, a determining module 73, and a first determining module 74.

The first receiving module 71 is used to receive a synchronization signal block sent by a base station; wherein the synchronization signal block sent by the base station is sent in a broadcast manner.

The second receiving module 72 is used to receive synchronization indication information sent by the base station, wherein the synchronization indication information is used to indicate the synchronization signal block sent by the base station, the synchronization indication information is first indication information, or the synchronization indication information includes the first indication information and second indication information, the first indication information is sent by the base station through system information and the second indication information is sent by the base station through a Radio Resource Control (RRC) signaling.

The determining module 73 is used to determine multiplexing information among at least two of a RMSI CORESET (Remaining Minimum System Information (RMSI) Control Resource Set (CORESET)), a UE-specific CORESET (UE-specific Control Resource Set) and an other CORESET The first determining module 74 is used to determine a time-frequency resource position for data reception according to the multiplexing information and the synchronization indication information.

The first receiving module 71 and the second receiving module 72 may be independent modules, or may be implemented by the same module.

The received information may include at least one of: the RMSI CORESET, an RMSI PDSCH, the UE-specific CORESET, a UE-specific PDSCH, a common PDSCH and an other CORESET.

The other CORESET is a CORESET different from the RMSI CORESET and the UE-specific CORESET; or the other CORESET is a CORESET other than the RMSI CORESET and the UE-specific CORESET, for example, a CORESET of an RACH message, a CORESET of a broadcasted OSI, a CORESET of a Paging, etc.

The common PDSCH is a PDSCH different from the RMSI PDSCH and the UE-specific PDSCH; or the common PDSCH is a PDSCH other than the RMSI PDSCH and the UE-specific PDSCH, for example, a PDSCH of the RACH message, a PDSCH of the broadcasted OSI, a PDSCH of the Paging, and the like.

The RACH message includes a Random Access Response (RAR, i.e., Msg2) and contention resolution (Contention Resolution, i.e., Msg4) in a RACH procedure.

In the embodiments of the present disclosure, optionally, the system information may be RMSI. In some other embodiments of the present disclosure, it is not excluded that the first indication information is sent using other system information.

The UE-specific PDSCH is a PDSCH specific to a terminal.

In the embodiments of the present disclosure, the terminal can determine a resource location for data reception more accurately according to the synchronization indication information sent by the base station and a multiplexing condition of CORESETs.

In order to correctly perform the rate de-matching, in some embodiments of the present disclosure, optionally, the synchronization indication information may include second indication information. The second indication information is used for indicating a synchronization signal block sent by the base station, wherein, synchronization signal blocks sent by the base station indicated in auxiliary indication information corresponding to different terminals are the same or different.

In the embodiments of the present disclosure, optionally, the second indication information may indicate, in a full bitmap (Full bitmap) manner, a synchronization signal block sent by the base station. Since the second indication information indicates, in the full bitmap manner, the synchronization signal block sent by the base station, such indication is more accurate, and such problems are addressed that information of the synchronization signal block indicated by the base station through the system information is inaccurate, and that the terminal is caused to possibly attempt to search and detect some undetectable synchronization signal blocks and unnecessary power consumption is generated, or that the terminal is caused to not search or detect some actually sent synchronization signal blocks and an inaccurate measurement result is obtained, or that it cannot be ensured that the terminal performs correct rate de-matching and reception of PDSCH/CORESET.

In the embodiments of the present disclosure, the base station may configure configuration information of three types of CORESETs (the RMSI CORESET, the UE-specific CORESET and an other CORESET) to the terminal, the configuration information includes time-frequency domain information of a corresponding CORESET, so that the terminal can determine multiplexing relationship among at least two of the three types of CORESETs according to the configuration information, determine multiplexing information among at least two of the RMSI CORESET, the UE-specific CORESET and the other CORESET.

In some embodiments of the present disclosure, for a case where one of the RMSI CORESET, the other CORESET, and the UE-specific CORESET is not multiplexed with the remaining two CORESETs, the first determining module 74 is used to, in a case that the synchronization indication information includes the first indication information and the second indication information, perform following: (1) in a case that the RMSI CORESET is not multiplexed with the other CORESET and the RMSI CORESET is not multiplexed with the UE-specific CORESET, determining, for the RMSI PDSCH and the RMSI CORESET, whether or not a time-frequency resource position of the RMSI PDSCH or the RMSI CORESET is overlapped with a time-frequency resource position of the synchronization signal block sent by the base station indicated in the first indication information and/or the second indication information; if overlaps, then determining the overlapped time-frequency resource position is used for sending the RMSI PDSCH or the RMSI CORESET; if not overlaps, then determining that the synchronization signal block sent by the base station indicated in the first indication information and/or the second indication information is the synchronization signal block actually sent by the base station; or (2) in a case that the UE-specific CORESET is not multiplexed with the other CORESET and the UE-specific CORESET is not multiplexed with the RMSI CORESET, determining, for the UE-specific PDSCH and the UE-specific CORESET, that the synchronization signal block sent by the base station indicated in the second indication information is a synchronization signal block actually sent by the base station, and determining that the UE-specific PDSCH and the UE-specific CORESET are transmitted at time-frequency resource positions other than the time-frequency resource position of the synchronization signal block sent by the base station indicated in the second indication information; or (3) in a case that the other CORESET is not multiplexed with the UE-specific CORESET and the other CORESET is not multiplexed with the RMSI CORESET, determining, for a common PDSCH and an other CORESET, that a synchronization signal block sent by the base station indicated in the first indication information is a synchronization signal block actually sent by the base station, and determining that the common PDSCH and the other CORESET are sent on time-frequency resource positions other than the time-frequency resource position of the synchronization signal block sent by the base station indicated in the first indication information.

In some embodiments of the present disclosure, the first determining module 74 is further used to perform following: (1) in a case that the RMSI CORESET is not multiplexed with the other CORESET and the RMSI CORESET is not multiplexed with the UE-specific CORESET, determining, for the RMSI PDSCH and the RMSI CORESET, whether or not a time-frequency resource position of the RMSI PDSCH or the RMSI CORESET is overlapped with a time-frequency resource position of the synchronization signal block sent by the base station indicated in the first indication information; if overlaps, then determining the overlapped time-frequency resource position is used for sending the RMSI PDSCH or the RMSI CORESET; if not overlaps, then determining that the synchronization signal block sent by the base station indicated in the first indication information is the synchronization signal block actually sent by the base station; or (2) in a case that the UE-specific CORESET is not multiplexed with the other CORESET and the UE-specific CORESET is not multiplexed with the RMSI CORESET, determining, for the UE-specific PDSCH and the UE-specific CORESET, that the synchronization signal block sent by the base station indicated in the first indication information is a synchronization signal block actually sent by the base station, and determining that the UE-specific PDSCH and the UE-specific CORESET are transmitted at time-frequency resource positions other than the time-frequency resource position of the synchronization signal block sent by the base station indicated in the first indication information; or (3) in a case that the other CORESET is not multiplexed with the UE-specific CORESET and the other CORESET is not multiplexed with the RMSI CORESET, determining, for a common PDSCH and an other CORESET, that a synchronization signal block sent by the base station indicated in the first indication information is a synchronization signal block actually sent by the base station, and determining that the common PDSCH and the other CORESET are sent on time-frequency resource positions other than the time-frequency resource position of the synchronization signal block sent by the base station indicated in the first indication information.

In some embodiments of the present disclosure, (1) the first determining module 74 is used to, in a case that the synchronization indication information is the first indication information, and the multiplexing information indicates that at least one of the other CORESET and the UE-specific CORESET are multiplexed with the RMSI CORESET, and in a case that the time-frequency resource position of the multiplexed CORESET is overlapped with the time-frequency resource position of the synchronization signal block sent by the base station indicated in the first indication information, determine that the overlapped time-frequency resource position is used for receiving the multiplexed CORESET; or (2) the first determining module 74 is used to, in a case that the synchronization indication information includes the first indication information and the second indication information, and the multiplexing information indicates that at least one of the other CORESET and the UE-specific CORESET are multiplexed with the RMSI CORESET, and in a case that the time-frequency resource position of the multiplexed CORESET is overlapped with the time-frequency resource position of the synchronization signal block sent by the base station indicated in the first indication information and/or the second indication information, determine that the overlapped time-frequency resource position is used for receiving the multiplexed CORESET.

In some embodiments of the present disclosure, the first determining module 74 is used to, in a case that the multiplexing information indicates that the UE-specific CORESET and the other CORESET are multiplexed, but neither the UE-specific CORESET nor the other CORESET is multiplexed with the RMSI CORESET, determine that the synchronization signal block sent by the base station indicated in the first indication information is a synchronization signal block actually sent by the base station, and, determine that the multiplexed CORESET is sent on a time-frequency resource position other than the time-frequency resource position of the synchronization signal block sent by the base station indicated in the first indication information.

In some embodiments of the present disclosure, the first determining module 74 is used to perform the following: (1) in a case that the synchronization indication information is the first indication information, and the multiplexing information indicates that the other CORESET and the RMSI CORESET are multiplexed, but neither the other CORESET nor the RMSI CORESET is multiplexed with the UE-specific CORESET, and the time-frequency resource position of the common PDSCH scheduled by the multiplexed CORESET is overlapped with the time-frequency resource position of the synchronization signal block sent by the base station indicated in the first indication information, determining that the overlapped time-frequency resource position is used for sending the common PDSCH scheduled by the multiplexed CORESET; or (2) in a case that the synchronization indication information is the first indication information, and the multiplexing information indicates that the other CORESET and the RMSI CORESET are multiplexed, but neither the other CORESET nor the RMSI CORESET is multiplexed with the UE-specific CORESET, and the time-frequency resource position of the RMSI PDSCH scheduled by the multiplexed CORESET is overlapped with the time-frequency resource position of the synchronization signal block sent by the base station indicated in the first indication information, determining that the overlapped time-frequency resource position is used for sending the RMSI PDSCH scheduled by the multiplexed CORESET; or the first determining module 74 is used to perform the following: (1) in a case that the synchronization indication information includes the first indication information and the second indication information, and the multiplexing information indicates that the other CORESET and the RMSI CORESET are multiplexed, but neither the other CORESET nor the RMSI CORESET is multiplexed with the UE-specific CORESET, and the time-frequency resource position of the common PDSCH scheduled by the multiplexed CORESET is overlapped with the time-frequency resource position of the synchronization signal block sent by the base station indicated in the first indication information and/or the second indication information, determining that the overlapped time-frequency resource position is used for sending the common PDSCH scheduled by the multiplexed CORESET; or (2) in a case that the synchronization indication information includes the first indication information and the second indication information, and the multiplexing information indicates that the other CORESET and the RMSI CORESET are multiplexed, but neither the other CORESET nor the RMSI CORESET is multiplexed with the UE-specific CORESET, and the time-frequency resource position of the RMSI PDSCH scheduled by the multiplexed CORESET is overlapped with the time-frequency resource position of the synchronization signal block sent by the base station indicated in the first indication information and/or the second indication information, determining that the overlapped time-frequency resource position is used for sending the RMSI PDSCH scheduled by the multiplexed CORESET.

In some embodiments of the present disclosure, the first determining module 74 is used to: (1) in a case that the synchronization indication information is the first indication information and the multiplexing information indicates that both the UE-specific CORESET and the other CORESET are multiplexed with the RMSI CORESET, perform following: (a) in a case that the time-frequency resource position of the common PDSCH scheduled by the multiplexed CORESET is overlapped with the time-frequency resource position of the synchronization signal block sent by the base station indicated in the first indication information, determining that the overlapped time-frequency resource position is used for sending the common PDSCH scheduled by the multiplexed CORESET; or (b) in a case that the time-frequency resource position of the RMSI PDSCH scheduled by the multiplexed CORESET is overlapped with the time-frequency resource position of the synchronization signal block sent by the base station indicated in the first indication information, determining that the overlapped time-frequency resource position is used for sending the RMSI PDSCH scheduled by the multiplexed CORESET; or (c) determining, for the UE-specific PDSCH scheduled by the multiplexed CORESET, that the synchronization signal block sent by the base station indicated in the first indication information is the synchronization signal block actually sent by the base station, and determining that the UE-specific PDSCH scheduled by the multiplexed CORESET is sent on a time-frequency resource position other than the time-frequency resource position of the synchronization signal block sent by the base station indicated in the first indication information; or (2) in a case that the synchronization indication information includes the first indication information and the second indication information, and the multiplexing information indicates that both the UE-specific CORESET and the other CORESET are multiplexed with the RMSI CORESET, perform the following: (d) in a case that the time-frequency resource position of the common PDSCH scheduled by the multiplexed CORESET is overlapped with the time-frequency resource position of the synchronization signal block sent by the base station indicated in the first indication information and/or the second indication information, determining that the overlapped time-frequency resource position is used for sending the common PDSCH scheduled by the multiplexed CORESET; or (e) in a case that the time-frequency resource position of the RMSI PDSCH scheduled by the multiplexed CORESET is overlapped with the time-frequency resource position of the synchronization signal block sent by the base station indicated in the first indication information and/or the second indication information, determining the overlapped time-frequency resource position is used for sending the RMSI PDSCH scheduled by the multiplexed CORESET; or (f) determining, for the UE-specific PDSCH scheduled by the multiplexed CORESET, that the synchronization signal block sent by the base station indicated in the second indication information is a synchronization signal block actually sent by the base station, and determining that the UE-specific PDSCH scheduled by the multiplexed CORESET is sent on a time-frequency resource position other than the time-frequency resource position of the synchronization signal block sent by the base station indicated in the second indication information.

In some embodiments of the present disclosure, the first determining module 74 is used to, (1) in a case that the synchronization indication information is the first indication information, and the multiplexing information indicates that the UE-specific CORESET and the RMSI CORESET are multiplexed, but neither the UE-specific CORESET nor the RMSI CORESET is multiplexed with the other CORESET, perform the following: (a) in a case that the time-frequency resource position of the RMSI PDSCH scheduled by the multiplexed CORESET is overlapped with the time-frequency resource position of the synchronization signal block sent by the base station indicated in the first indication information, determining that the overlapped time-frequency resource position is used for sending the RMSI PDSCH scheduled by the multiplexed CORESET; or (b) determining, for the UE-specific PDSCH scheduled by the multiplexed CORESET, that the synchronization signal block sent by the base station indicated in the first indication information is the synchronization signal block actually sent by the base station, and determining that the UE-specific PDSCH scheduled by the multiplexed CORESET is sent on a time-frequency resource position other than the time-frequency resource position of the synchronization signal block sent by the base station indicated in the first indication information; or (2) in a case that the synchronization indication information includes the first indication information and the second indication information, and the multiplexing information indicates that the UE-specific CORESET and the RMSI CORESET are multiplexed, but neither the UE-specific CORESET nor the RMSI CORESET is multiplexed with the other CORESET, perform the following: (c) in a case that the time-frequency resource position of the RMSI PDSCH scheduled by the multiplexed CORESET is overlapped with the time-frequency resource position of the synchronization signal block sent by the base station indicated in the first indication information and/or the second indication information, determining that the overlapped time-frequency resource position is used for sending the RMSI PDSCH scheduled by the multiplexed CORESET; or (d) determining, for the UE-specific PDSCH scheduled by the multiplexed CORESET, that the synchronization signal block sent by the base station indicated in the second indication information is a synchronization signal block actually sent by the base station, and determining that the UE-specific PDSCH scheduled by the multiplexed CORESET is sent on a time-frequency resource position other than the time-frequency resource position of the synchronization signal block sent by the base station indicated in the second indication information.

In some embodiments of the present disclosure, the first determining module 74 is used to, (1) in a case that the synchronization indication information is the first indication information, and the multiplexing information indicates that the UE-specific CORESET and the other CORESET are multiplexed, and neither the UE-specific CORESET nor the other CORESET is multiplexed with the RMSI CORESET, perform the following: (a) determining, for the common PDSCH scheduled by the multiplexed CORESET, that the synchronization signal block sent by the base station indicated in the first indication information is the synchronization signal block actually sent by the base station, and determining that the common PDSCH scheduled by the multiplexed CORESET is sent on a time-frequency resource position other than the time-frequency resource position of the synchronization signal block sent by the base station indicated in the first indication information; or (b) determining, for the UE-specific PDSCH scheduled by the multiplexed CORESET, that the synchronization signal block sent by the base station indicated in the first indication information is the synchronization signal block actually sent by the base station, and determining that the UE-specific PDSCH scheduled by the multiplexed CORESET is sent on a time-frequency resource position other than the time-frequency resource position of the synchronization signal block sent by the base station indicated in the first indication information; or (2) in a case that the synchronization indication information includes the first indication information and the second indication information, and the multiplexing information indicates that the UE-specific CORESET and the other CORESET are multiplexed, and neither the UE-specific CORESET nor the other CORESET is multiplexed with the RMSI CORESET, perform the following: (c) determining, for the common PDSCH scheduled by the multiplexed CORESET, that the synchronization signal block sent by the base station indicated in the first indication information is the synchronization signal block actually sent by the base station, and determining that the common PDSCH scheduled by the multiplexed CORESET is sent on a time-frequency resource position other than the time-frequency resource position of the synchronization signal block sent by the base station indicated in the first indication information; or (d) determining, for the UE-specific PDSCH scheduled by the multiplexed CORESET, that the synchronization signal block sent by the base station indicated in the second indication information is the synchronization signal block actually sent by the base station, and determining that the UE-specific PDSCH scheduled by the multiplexed CORESET is sent on a time-frequency resource position other than the time-frequency resource position of the synchronization signal block sent by the base station indicated in the second indication information.

In a carrier aggregation scene, the secondary cell also sends a synchronization signal block, however, the terminal does not attempt access on the secondary cell and therefore does not read the synchronization signal block of the secondary cell. Thus, the information of the synchronization signal block actually sent cannot be obtained from the system information. In a case that scheduling and transmission of downlink data occur between a terminal and the secondary cell, an error in the rate de-matching may occur because the information of the synchronization signal block actually sent by the secondary cell is not known. Thus, in some embodiments of the present disclosure, optionally, the terminal further includes a third receiving module and a second determining module. The third receiving module is used to receive third indication information sent by the base station through a radio resource control signaling, wherein the third indication information is used to indicate the synchronization signal block sent by the secondary cell. The second determining module is used to, in a case that the terminal needs to perform traffic transmission on time-frequency resources of the secondary cell, determine that the received information on a secondary cell carrier is sent on a time-frequency resource position on the secondary cell carrier other than a time-frequency resource position of a synchronization signal block sent by the secondary cell needed to be indicated by the third indication information.

Thus, the terminal can know the synchronization signal block sent by the secondary cell, and can correctly perform the rate de-matching in a case that scheduling and transmission of downlink data occur between the terminal and the secondary cell.

In some embodiments of the present disclosure, the terminal may further include a third determining module. The third determining module is used to, (1) in a case that the synchronization indication information is the first indication information and the third indication information sent by the base station to the terminal through the radio resource control signaling is not received, determine that the synchronization signal block sent by the secondary cell needed to be indicated by the third indication information is the same as the synchronization signal block sent by the base station indicated in the first indication information, determine that the received information on the secondary cell carrier is sent on a time-frequency resource position on the secondary cell carrier other than the time-frequency resource position of the synchronization signal block sent by the base station indicated in the first indication information; or (2) in a case that the synchronization indication information includes the first indication information and the second indication information, and the third indication information sent by the base station to the terminal through the radio resource control signaling is not received, determine that the synchronization signal block sent by the secondary cell needed to be indicated by the third indication information is the same as the synchronization signal block sent by the base station indicated in the second indication information, determine that the received information on the secondary cell carrier is sent on a time-frequency resource position on the secondary cell carrier other than the time-frequency resource position of the synchronization signal block sent by the base station indicated in the second indication information; or (3) determine, in a case that the third indication information sent by the base station to the terminal through the radio resource control signaling is not received, that the secondary cell does not send a synchronization signal block, wherein the third indication information is used to indicate the synchronization signal block sent by the secondary cell.

After the terminal receives the synchronization signal block, the terminal may measure the synchronization signal block and report a result of the measurement, and the base station performs a cell handover procedure or a cell reselection procedure according to the result of the measurement. In order to enable the terminal to obtain more accurate information of the synchronization signal block for performing measurement, in some embodiments of the present disclosure, optionally, the terminal further includes a fourth receiving module and a first measuring module. The fourth receiving module is used to receive fourth indication information sent by the base station through a radio resource control signaling, wherein the fourth indication information is used to indicate a synchronization signal block needed to be measured by the terminal. The first measuring module is used to measure, within an SMTC measurement period, the synchronization signal block indicated in the fourth indication information.

Thus, the terminal is assisted to measure the synchronization signal block, and a time duration required for blind detection and measurement of the synchronization signal block is shortened, and energy of the terminal may be reduced.

In the embodiments of the present disclosure, the terminal may further include a second measuring module. The second measuring module is used to: (1) in a case that the synchronization indication information is the first indication information, and the fourth indication information sent by the base station to the terminal through a radio resource control signaling is not received, determine that a synchronization signal block needed to be measured by the terminal which needs to be indicated in the fourth indication information is the same as the synchronization signal block sent by the base station indicated in the first indication information, and, measure the synchronization signal block indicated by the first indication information within a SMTC measurement period; or (2) in a case that the synchronization indication information includes the first indication information and the second indication information, and the fourth indication information sent by the base station to the terminal through the radio resource control signaling is not received, determine that the synchronization signal block needed to be measured by the terminal which needs to be indicated in the fourth indication information is the same as the synchronization signal block sent by the base station indicated in the second indication information, and, measure the synchronization signal block indicated by the second indication information within a SMTC measurement period, wherein the fourth indication information is used to indicate a synchronization signal block needed to be measured by the terminal.

In the embodiments of the present disclosure, synchronization signal blocks sent by the base station indicated in the fourth indication information corresponding to different terminals and needed to be measured by the terminals may be the same or different.

In the embodiments of the present disclosure, the fourth indication information may indicate, in a full bitmap manner, the synchronization signal block needed to be measured by the terminal.

In the embodiments of the present disclosure, in a case that the fourth indication information is used for a serving cell (i.e., a corresponding SMTC is used for measuring the serving cell), the fourth indication information may be the same as or different from the second indication information, and may also be the same as or different from the third indication information. For example, in a case that a neighbor cell and a local cell measured by a corresponding SMTC are intra-frequency cells, the fourth indication information may be a union set of the second indication information of the local cell and the second indication information of the neighbor cell, or may be a subset of the union set; in a case that the neighbor cell and the local cell measured by the SMTC are inter-frequency cells, the fourth indication information may be the same as the second indication information or may be a subset of the second indication information.

In addition, in the embodiments of the present disclosure, if the base station does not configure the indication information to a terminal in a connected state, the terminal measures all synchronization signal blocks in the SMTC measurement period by default. For a terminal in an idle state, the base station does not configure the fourth indication information, and the terminal measures all synchronization signal blocks in the SMTC measurement period by default.

A synchronization signal block may also be used for radio link monitoring. In order to enable the terminal to obtain more accurate information of the synchronization signal block for the radio link monitoring, in some embodiments of the present disclosure, optionally, the terminal may further include a fifth receiving module and a first monitoring module. The fifth receiving module is used to receive fifth indication information sent by the base station through a radio resource control signaling, wherein the fifth indication information is used to indicate a synchronization signal block needed to be measured by the terminal and being used for the radio link monitoring. The first monitoring module is used to measure the synchronization signal block indicated in the fifth indication information, and using the measurement for the radio link monitoring.

In some embodiments of the present disclosure, the terminal may further include a second monitoring module. The second monitoring module is used to: (1) in a case that the synchronization indication information is the first indication information and the fifth indication information sent by the base station to the terminal through the radio resource control signaling is not received, determine that the synchronization signal block needed to be measured by the terminal and being used for the radio link monitoring which needs to be indicated in the fifth indication information is the same as the synchronization signal block sent by the base station indicated in the first indication information, measure the synchronization signal block indicated in the first indication information and use the measurement for the radio link monitoring; or (2) in a case that the synchronization indication information includes the first indication information and the second indication information, and the fifth indication information sent by the base station to the terminal through the radio resource control signaling is not received, determine that the synchronization signal block needed to be measured by the terminal and being used for the radio link monitoring which needs to be indicated in the fifth indication information is the same as the synchronization signal block sent by the base station indicated in the second indication information, measure the synchronization signal block indicated in the second indication information and use the measurement for the radio link monitoring, wherein the fifth indication information is used to indicate a synchronization signal block needed to be measured by the terminal and being used for radio link monitoring.

In some embodiments, the fifth indication information indicates, in a bitmap manner, the synchronization signal block needed to be measured and being used for the radio link monitoring; optionally, the fifth indication information indicates, in a full bitmap manner, the synchronization signal block needed to be measured and being used for the radio link monitoring, so that the indicated synchronization signal block needed to be measured and being used for the radio link monitoring is more accurate.

In some other embodiments, the fifth indication information indicates the number of synchronization signal blocks needed to be measured and being used for radio link monitoring, e.g., indicates that synchronization signal blocks needed to be measured and being used for the radio link monitoring are the first two synchronization signal blocks of the synchronization signal blocks actually received, so as to reduce the number of bits occupied by the fifth indication information.

In some other embodiments, the fifth indication information indicates a time index of a synchronization signal block needed to be measured and being used for radio link monitoring.

The terminal in the embodiments of the present disclosure may be a wireless terminal or a wired terminal. The wireless terminal may be a device that provides voice and/or other service data connectivity to a user, a handheld device having a wireless connection function, or another processing device connected to a wireless modem. The wireless terminal may communicate with one or more core networks via a Radio Access Network (RAN), and the wireless terminal may be a terminal, such as a mobile telephone (or a "cellular" phone) or a computer with a terminal, for example, may be a portable mobile device, a pocket-sized mobile device, a hand-held mobile device, a computer-built-in mobile device or an on-board mobile device, which exchange language and/or data with the Radio Access Network. For example, a Personal Communication Service (PCS) telephone, a cordless telephone, a Session Initiation Protocol (SIP) telephone, a Wireless Local Loop (WLL) station, a Personal Digital Assistant (PDA), or the like. The wireless terminal may also be referred to as a system, a Subscriber Unit, a Subscriber Station, a Mobile Station, a Mobile, a Remote Station, a Remote Terminal, an Access Terminal, a User Terminal, a User Agent, and a User Device or a User Equipment, which are not limited herein.

Twenty-Sixth Embodiment

The twenty-sixth embodiment of the present disclosure also provides a base station. The base station includes a processor, a storage, and a computer program stored on the storage and executable by the processor, wherein in a case that the computer program is executed by the processor, the processor implements steps of the method of indicating a synchronization signal block in any of the embodiments described above.

Twenty-Seventh Embodiment

The twenty-seventh embodiment of the present disclosure also provides a terminal. The terminal includes a processor, a storage, and a computer program stored on the storage and executable by the processor, wherein in a case that the computer program is executed by the processor, the processor implements steps of the method of processing synchronization indication information in any of the embodiments described above.

Twenty-Eighth Embodiment

The twenty-eighth embodiment of the present disclosure also provides a computer readable storage medium. The computer readable storage medium includes a computer program stored on the computer readable storage medium, wherein in a case that the computer program is executed by a processor, the processor implements steps of the method of indicating a synchronization signal block in any of the embodiments described above.

Twenty-Ninth Embodiment

The twenty-ninth embodiment of the present disclosure also provides a computer readable storage medium. The computer readable storage medium includes a computer program stored on the computer readable storage medium, wherein in a case that the computer program is executed by a processor, the processor implements steps of the method of processing synchronization indication information in any of the embodiments described above.

The computer-readable storage medium may be a Read-Only Memory (ROM) or a Random Access (RAM), a magnetic disk or a compact disc, or the like.

Thirty Embodiment

Figure 9:
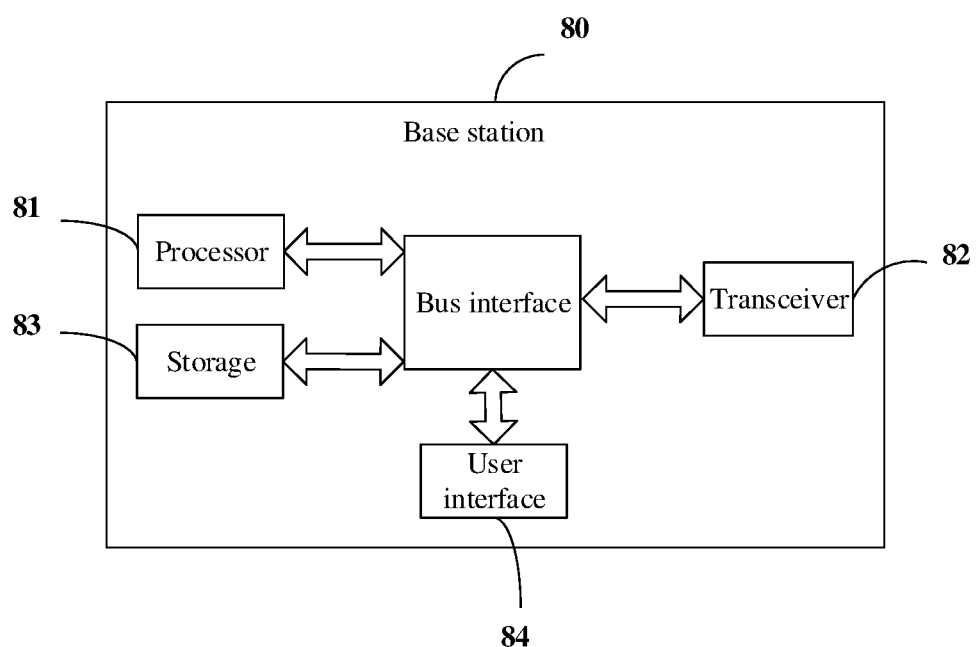
FIG. 9 is a structural schematic diagram of a base station according to a thirty embodiment of the present disclosure.

Referring to FIG. 9, FIG. 9 is a structural schematic diagram of a base station according to the thirty embodiment of the present disclosure. The base station 80 includes a processor 81, a transceiver 82, a storage 83, a user interface 84, and a bus interface, wherein, in the embodiments of the present disclosure, the base station 80 further includes a computer program store on the storage 83 and executable by the processor 81, and in a case that the computer program is executed by the processor 81, the processor 81 implements follow steps: sending a synchronization signal block; and sending synchronization indication information, wherein the synchronization indication information is used to indicate the synchronization signal block sent by the base station, the synchronization indication information is first indication information, or the synchronization indication information includes the first indication information and second indication information, the first indication information is sent by the base station through system information and the second indication information is sent by the base station through a Radio Resource Control (RRC) signaling.

In FIG. 8, a bus architecture may include any number of interconnected buses and bridges. Various circuits, specifically, one or more processors represented by the processor 81 and a storage represented by the storage 83, are linked together. The bus architecture may also link various other circuits such as peripherals, voltage regulators and power management circuits, which are well known in the art, and therefore a further description thereof is omitted herein. A bus interface provides interfaces. The transceiver 82 may be a plurality of elements, that is, includes a transmitter and a receiver, to provide units used to communicate with various other apparatuses over a transmission medium. For different user devices, the user interface 84 may also be an interface capable of internally or externally connecting with a desired device which includes, but is not limited to, a keypad, a display, a speaker, a microphone, a joystick, and the like.

The processor 81 is responsible for managing the bus architecture and general processing, and the storage 83 may store data used by the processor 81 when the processor 81 performs operations.

Optionally, in a case that the computer program is executed by the processor 81, the processor 81 further implements following steps.

Sending the synchronization signal block includes: sending the synchronization signal block through a first beam covering a first terminal and sending PDSCH data and/or CORESET to a second terminal through a second beam covering the second terminal, on a same time-frequency resource.

Sending the synchronization indication information includes: sending the second indication information (such as first second indication information and second second indication information) to the first terminal and the second terminal through a radio resource control signaling, wherein the first second indication information corresponding to the first terminal indicates the synchronization signal block sent by the base station through the first beam on a current time-frequency resource, the second second indication information corresponding to the second terminal indicates that the base station does not send the synchronization signal block through the second beam on the current time-frequency resource; or, both the first second indication information corresponding to the first terminal and the second indication information corresponding to the second terminal indicate the synchronization signal block sent by the base station on the current time-frequency resource.

Optionally, in a case that the computer program is executed by the processor 81, the processor 81 further implements a following step: sending third indication information to the terminal through a radio resource control signaling, wherein the third indication information is used to indicate the synchronization signal block sent by the secondary cell.

Optionally, in a case that the computer program is executed by the processor 81, the processor 81 further implements a following step: sending fourth indication information to the terminal through a radio resource control signaling, wherein the fourth indication information is used to indicate a synchronization signal block needed to be measured by the terminal.

Optionally, in a case that the computer program is executed by the processor 81, the processor 81 further implements a following step: sending fifth indication information to the terminal through a radio resource control signaling, wherein the fifth indication information is used to indicate a synchronization signal block needed to be measured by the terminal and being used for radio link monitoring.

Optionally, the fifth indication information indicates, in a bitmap manner, the synchronization signal block needed to be measured and being used for the radio link monitoring, optionally, the fifth indication information indicates, in a full bitmap manner, the synchronization signal block needed to be measured and being used for the radio link monitoring; or the fifth indication information indicates the number of synchronization signal blocks needed to be measured and being used for radio link monitoring, or the fifth indication information indicates a time index of a synchronization signal block needed to be measured and being used for radio link monitoring.

In the base station according to the embodiments of the present disclosure, synchronization indication information is sent to the terminal to assist the terminal to obtain a correct synchronization signal block actually sent by the base station, so that the terminal can correctly determine a time-frequency resource position for data reception, measurement or radio link monitoring, etc.

Thirty-First Embodiment

Figure 10:
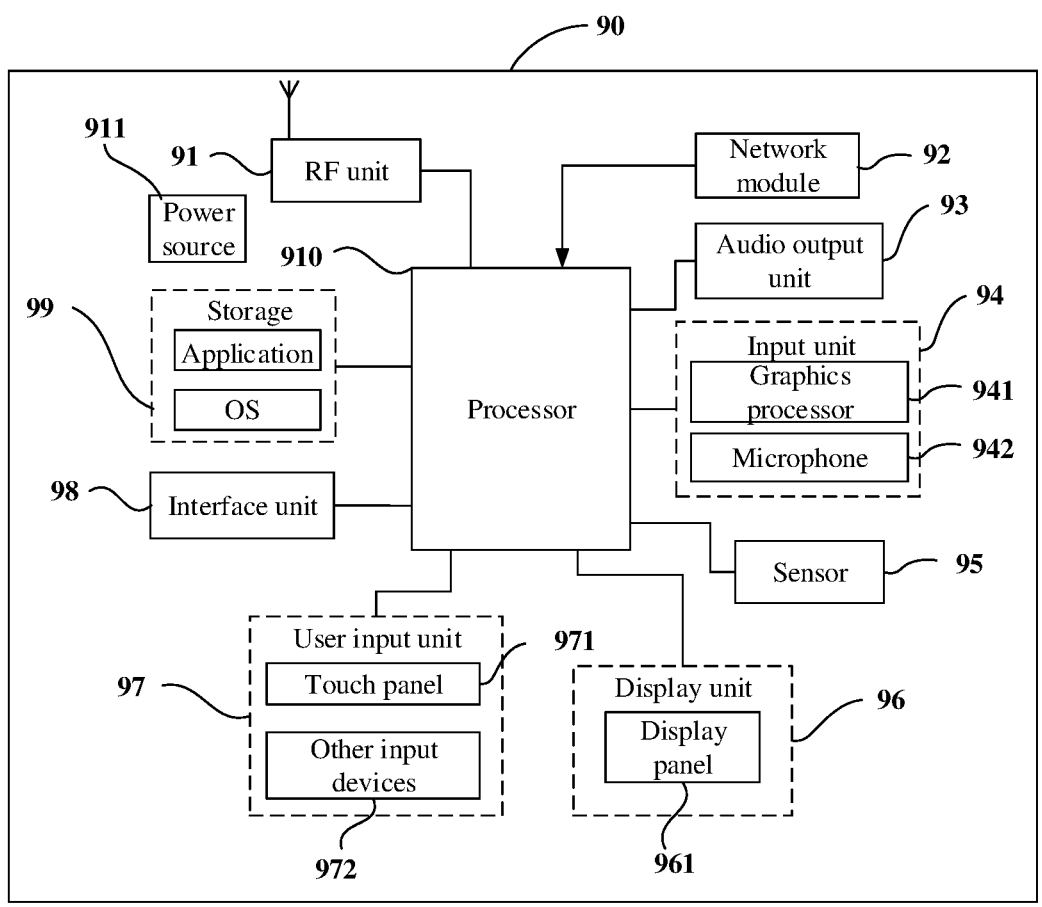
FIG. 10 is a structural schematic diagram of a terminal according to a thirty-first embodiment of the present disclosure.

FIG. 10 is a schematic structural diagram of a terminal according to a thirty-first embodiment of the present disclosure. The terminal 90 includes, but is not limited to, a radio frequency (RF) unit 91, a network module 92, an audio output unit 93, an input unit 94, a sensor 95, a display unit 96, a user input unit 97, an interface unit 98, a storage 99, a processor 910, and a power source 911. Those skilled in the art will appreciate that a structure of the terminal shown in FIG. 9 does not constitute a definition of the terminal, and that the terminal may include more or fewer components than illustrated, or may combine certain components, or a different arrangement of the components. In the embodiments of the present disclosure, the terminal includes, but is not limit to, a cellular phone, a tablet computer, a notebook computer, a handheld computer, a vehicle-mounted terminal, a wearable device, a pedometer, and the like.

The radio frequency unit 91 is used to receive a synchronization signal block sent by a base station; and receive synchronization indication information sent by the base station, wherein the synchronization indication information is used to indicate the synchronization signal block sent by the base station, the synchronization indication information is first indication information, or the synchronization indication information includes the first indication information and second indication information, the first indication information is sent by the base station through system information and the second indication information is sent by the base station through a Radio Resource Control (RRC) signaling.

The processor 910 is used to determine multiplexing information among at least two of an RMSI CORESET, a UE-specific CORESET and an other CORESETT; and determine a time-frequency resource position for data reception based on the multiplexing information and the synchronization indication information.

In the embodiments of the present disclosure, the terminal can determine a resource location for data reception more accurately according to the synchronization indication information sent by the base station and a multiplexing condition of CORESETs.

It should be understood that, in the embodiments of the present disclosure, the radio frequency unit 91 may be used for receiving and sending information or signals during a call. Specifically, the radio frequency unit 91 is used to, after receiving downlink data from the base station, transfer the downlink data to the processor 910 for processing; and send uplink data to the base station. In general, the radio frequency unit 91 includes, but is not limited to, an antenna, at least one amplifier, a transceiver, a coupler, a low noise amplifier, a duplexer, and the like. In addition, the radio frequency unit 91 may also communicate with a network and other devices through a wireless communication system.

The terminal provides wireless broadband Internet access to a user via the network module 92, such as assisting the user in sending and receiving emails, browsing web pages, accessing streaming media, and the like.

The audio output unit 93 may convert audio data received by the radio frequency unit 91 or the network module 92 or stored in the storage 99 into an audio signal and output the audio signal as sound. The audio output unit 93 may also provide an audio output related to a specific function performed by the terminal 90 (e.g., a call signal reception sound, a message reception sound, etc.). The audio output unit 93 includes a speaker, a buzzer, a receiver, and the like.

The input unit 94 is used to receive audio or video signals. The input unit 94 may include a graphic processor (a Graphics Processing Unit (GPU)) 941 and a microphone 942. The graphics processor 941 processes image data of still pictures or video obtained by an image capture device (such as a camera) in a video capture mode or an image capture mode. The processed image frame may be displayed on the display unit 96. Image frames processed by the graphics processor 941 may be stored in the storage 99 (or another storage medium) or sent via the radio frequency unit 91 or the network module 92. The microphone 942 may receive sound and be capable of processing such sound as audio data. The processed audio data may be converted, in a case of a telephone call mode, into a format output transmittable to a mobile communication base station via the radio frequency unit 91.

The terminal 90 also includes at least one sensor 95, such as a light sensor, a motion sensor, and other sensors. In particular, the light sensor includes an ambient light sensor that can adjust the brightness of the display panel 961 according to the intensity of ambient light, and a proximity sensor that can turn off the display panel 961 or turn off a display panel 961 and/or a backlight in a case that the terminal 90 moves close to an ear. As one type of motion sensor, an accelerometer sensor can detect a magnitude of acceleration in various directions (generally in three axis directions), detect a magnitude and a direction of gravity when the accelerometer sensor is stationary, and can be used to recognize a posture of the terminal (such as a horizontal/vertical screen switching, related games, magnetometer attitude calibration), vibration-recognition related functions (such as a pedometer, a knock); the sensor 95 may further include a fingerprint sensor, a pressure sensor, an iris sensor, a molecular sensor, a gyroscope, a barometer, a hygrometer, a thermometer, an infrared sensor, and the like, which will not be described here.

The display unit 96 is used to display information inputted by a user or information provided to the user. The display unit 96 may include a display panel 961. The display panel 961 is configured in a form of a Liquid Crystal Display (LCD) and an Organic Light-Emitting Diode (OLED) or the like.

The user input unit 97 may be used to receive inputted numeric or character information and to generate key signal inputs related to user settings and function control of the terminal. Specifically, the user input unit 97 includes a touch panel 971 and other input devices 972. The touch panel 971, also referred to as a touch screen, may collect touch operations on or near the touch panel by a user (such as touch operations of the user on or near the touch panel 971 using any suitable object or accessory, such as a finger, a stylus, and the like). The touch panel 971 may include two parts, i.e., a touch detector and a touch controller, wherein the touch detector detects a touch orientation of the user, detects a signal caused by the touch operation, and transmits the signal to the touch controller; the touch controller receives touch information from the touch detector, converts the touch information into contact coordinates, sends the contact coordinates to the processor 910, receives a command from the processor 910, and executes the command from the processor 910. In addition, the touch panel 971 may also be implemented in various types such as a resistive type, a capacitive type, an infrared ray type, and a surface acoustic wave type. The user input unit 97 may also include other input devices 972 in addition to the touch panel 971. Specifically, other input devices 972 may include, but are not limited to, a physical keyboard, function buttons (such as volume control buttons, switch buttons, etc.), a trackball, a mouse, and an operating lever, which are not described herein.

Further, the touch panel 971 may be overlaid on the display panel 961. When the touch panel 971 detects a touch operation on or near the touch panel 971, the touch panel 971 transmits information of the touch operation to the processor 910 to determine a type of a touch event. The processor 910 then provides a corresponding visual output on the display panel 961 according to the type of the touch event. Although in FIG. 9, the touch panel 971 and the display panel 961 are two separate components used to implement input and output functions of the terminal, the touch panel 971 and the display panel 961 in some embodiments may be integrated to realize the input and output functions of the terminal, and are not limited herein.

The interface unit 98 is an interface for connecting an external device to the terminal 90. For example, the external device may include a wired or wireless headset port, an external power source (or a battery charger) port, a wired or wireless data port, a memory card port, a port for connecting a device having an identification module, an audio input/output (I/O) port, a video I/O port, a headphone port, etc. The interface unit 98 may be used to receive input (e.g., data information, power and the like) from an external device and transmit the received input to one or more elements within the terminal 90 or may be used to transmit data between the terminal 90 and an external device.

The storage 99 may be used to store software programs and various types of data. The storage 99 may mainly include a storage program region and a storage data region, wherein the storage program region may store an operating system, an application program required by at least one function, such as a sound playing function, an image playing function, and the like; the storage data region may store data (such as audio data, phonebook, etc.) created according to usage of a mobile phone. Further, the storage 99 may include a high-speed random access memory, and may also include a non-volatile storage, such as at least one disk storage device, a flash memory device, or other volatile solid-state storage devices.

The processor 910 is a control center of the terminal, connects various parts of the entirety of the terminal using various interfaces and lines, and the processor 910 performs various functions of the terminal and processes data, by running or executing a software program and/or a module stored in the storage 99 and invoking data stored in the storage 99, thereby integrally monitoring the terminal. The processor 910 may include one or more processing units; optionally, the processor 910 may be integrated with an application processor and a modem processor, wherein the application processor primarily handles operating systems, user interfaces, application programs, and the like, and the modem processor primarily handles wireless communication. It will be appreciated that the above modem processor may not be integrated into the processor 910.

The terminal 90 may also include a power source 911, such as a battery, for powering various components, optionally the power supply 911 may be logically connected to the processor 910 through a power management system. Thereby, functions of charging management, discharging management, and power consumption management are realized by the power management system.

In addition, the terminal 90 includes some functional modules that are not shown and will not be described again here.

Those of ordinary skills in the art will appreciate that elements and algorithm steps of examples described in connection with the embodiments disclosed herein can be implemented in electronic hardware, or a combination of computer software and electronic hardware. Whether these functions are performed in a form of hardware or software depends on a specific application and design constraints of the technical solutions. Those skilled in the art may use different methods to implement the described functions for each particular application, but such implementation should not be determined to go beyond the protection scope of the present disclosure.

It can be clearly understood by those skilled in the art that, for convenience and brevity of description, specific working processes of the systems, devices and units described above can be obtained by referring to corresponding processes in the method embodiments described above, and will not be described again herein.

In the embodiments provided herein, it should be understood that the disclosed device and methods may be implemented in other ways. For example, the product embodiments described above are merely illustrative, for example, division of the units, which is only a logical function division, may be implemented in another division manner. For example, multiple units or components may be combined or integrated into another system, or some features may be ignored, or not performed. Optionally, coupling or direct coupling or communication connection shown or discussed between one and another may be an indirect coupling or communication connection through some interfaces, devices or units, may be in an electrical, mechanical or other form.

Elements described as separate elements may or may not be physically separate, elements shown as units may or may not be physical units, i.e. may be located in one place, or may also be distributed over a plurality of network elements. Some or all of the units therein may be selected according to needs to achieve the purpose of the embodiments of the present disclosure.

In addition, various functional units in various embodiments of the present disclosure may be integrated in one processing unit, may exist separately physically, or two or more functional units may be integrated in one unit.

The functions may be stored in a computer readable storage medium if implemented in a form of software functional units and sold or used as separate products. Based on such understanding, the essence of technical solutions of the present disclosure, or a part of the technical solutions contributing the prior art, or a part of the technical solutions may be embodied in a form of a software product stored in a storage medium, wherein a number of instructions are included in the storage medium to cause a computer device (which may be a personal computer, a server, or a network device, etc.) to perform all or a part of the steps of the method described in various embodiments of the present disclosure. The aforementioned storage medium includes a USB disk, a removable hard disk, a ROM, a RAM, a magnetic disk, an optical disk, and other media capable of storing program codes.

The above description is related to only specific embodiments of the present disclosure. The protection scope of the present disclosure is not limited thereto, and any person skilled in the art can easily think of changes or substitutions within the technical scope of the present disclosure, and such changes or substitutions are to be included within the protection scope of the present disclosure. Accordingly, the protection scope of the present disclosure shall be consistent with the protection scope of the claims.

What is claimed is:

1. A method of processing synchronization indication information, the method being applied to a terminal and comprising:
   receiving synchronization indication information sent by a base station; and
   determining a time-frequency resource position of a synchronization signal block to be sent by the base station according to second indication information if the synchronization indication information comprises first indication information and the second indication information, and if the time-frequency resource position of the synchronization signal block is overlapped with a time-frequency resource position of a Physical Downlink Shared Channel (PDSCH), determining that the overlapped time-frequency resource position of the synchronization signal block and the PDSCH is used to transmit the PDSCH; or,
   determining a time-frequency resource position of a synchronization signal block to determining a time-frequency resource position of a synchronization signal block to be sent by the base station according to the first indication information if the synchronization indication information comprises the first indication information and does not comprise the second indication information, and if the time-frequency resource position of the synchronization signal block is overlapped with a time-frequency resource position of a Physical Downlink Shared Channel (PDSCH), determining that the overlapped time-frequency resource position of the synchronization signal block and the PDSCH is used to transmit the PDSCH;
   wherein the first indication information is sent by the base station through system information and the second indication information is sent by the base station through a radio resource control signaling.

2. The method of processing synchronization indication information according to claim 1, further comprises:
   determining multiplexing information among at least two of a Remaining Minimum System Information Control Resource Set (RMSI CORESET), a User Equipment-specific CORESET (UE-specific CORESET) and an other CORESET; and,
   determining a time-frequency resource position for data reception according to the multiplexing information and the synchronization indication information, wherein the received information comprises at least one of:
   the RMSI CORESET, an RMSI PDSCH, the UE-specific CORESET, a UE-specific PDSCH, a common PDSCH or an other CORESET.

3. The method of processing synchronization indication information according to claim 2, wherein determining the time-frequency resource position for data reception according to the multiplexing information and the synchronization indication information comprises:
   if the synchronization indication information comprises the first indication information and does not comprise the second indication information, and the multiplexing information indicates that at least one of the other CORESET and the UE-specific CORESET are multiplexed with the RMSI CORESET, and if a time-frequency resource position of the multiplexed CORESET is overlapped with a time-frequency resource position of the synchronization signal block sent by the base station indicated in the first indication information, determining that the overlapped time-frequency resource position is used for receiving the multiplexed CORESET;
   if the synchronization indication information comprises the first indication if the synchronization indication information comprises the first indication information and the second indication information, and the multiplexing information indicates that at least one of the other CORESET or the UE-specific CORESET are multiplexed with the RMSI CORESET, and if a time-frequency resource position of the multiplexed CORESET is overlapped with a time-frequency resource position of the synchronization signal block sent by the base station indicated in at least one of the first indication information or the second indication information, determining that the overlapped time-frequency resource position is used for receiving the multiplexed CORESET.

4. The method of processing synchronization indication information according to claim 2, wherein determining the time-frequency resource position for data reception according to the multiplexing information and the synchronization indication information comprises:

if the synchronization indication information comprises the first indication information and does not comprise the second indication information, and the multiplexing information indicates that the other CORESET and the RMSI CORESET are multiplexed, but neither the other CORESET nor the RMSI CORESET is multiplexed with the UE-specific CORESET, and the time-frequency resource position of a common PDSCH scheduled by the multiplexed CORESET is overlapped with the time-frequency resource position of the synchronization signal block sent by the base station indicated in the first indication information, determining the overlapped time-frequency resource position is used for sending the common PDSCH scheduled by the multiplexed CORESET;

if the synchronization indication information comprises the first indication information and does not comprise the second indication information, and the multiplexing information indicates that the other CORESET and the RMSI CORESET are multiplexed, but neither the other CORESET nor the RMSI CORESET is multiplexed with the UE-specific CORESET, and the time-frequency resource position of a RMSI PDSCH scheduled by the multiplexed CORESET is overlapped with the time-frequency resource position of the synchronization signal block sent by the base station indicated in the first indication information, determining that the overlapped time-frequency resource position is used for sending the RMSI PDSCH scheduled by the multiplexed CORESET;

if the synchronization indication information comprises the first indication if the synchronization indication information comprises the first indication information and the second indication information, and the multiplexing information indicates that the other CORESET and the RMSI CORESET are multiplexed, but neither the other CORESET nor the RMSI CORESET is multiplexed with the UE-specific CORESET, and the time-frequency resource position of a common PDSCH scheduled by the multiplexed CORESET is overlapped with the time-frequency resource position of the synchronization signal block sent by the base station indicated in at least one of the first indication information or the second indication information, determining that the overlapped time-frequency resource position is used for sending the common PDSCH scheduled by the multiplexed CORESET;

if the synchronization indication information comprises the first indication information and the second indication information, and the multiplexing information indicates that the other CORESET and the RMSI CORESET are multiplexed, but neither the other CORESET nor the RMSI CORESET is multiplexed with the UE-specific CORESET, and the if the synchronization indication information comprises the first indication information and the second indication information, and the multiplexing information indicates that the other CORESET and the RMSI CORESET are multiplexed, but neither the other CORESET nor the RMSI CORESET is multiplexed with the UE-specific CORESET, and the time-frequency resource position of an RMSI PDSCH scheduled by the multiplexed CORESET is overlapped with the time-frequency resource position of the synchronization signal block sent by the base station indicated in at least one of the first indication information or the second indication information, determining the overlapped time-frequency resource position is used for sending the RMSI PDSCH scheduled by the multiplexed CORESET.

5. The method of processing synchronization indication information according to claim 2, wherein, determining the time-frequency resource position for data reception according to the multiplexing information and the synchronization indication information comprises:

(1) if the synchronization indication information comprises the first indication information and does not comprise second indication information and the multiplexing information indicates that both the UE-specific CORESET and the other CORESET are multiplexed with the RMSI CORESET, performing the following:

if the time-frequency resource position of a common PDSCH scheduled by the multiplexed CORESET is overlapped with the time-frequency resource position of the synchronization signal block sent by the base station indicated in the first indication information, determining that the overlapped time-frequency resource position is used for sending the common PDSCH scheduled by the multiplexed CORESET; or, if the time-frequency resource position of a RMSI PDSCH scheduled by the multiplexed CORESET is overlapped with the time-frequency resource position of the synchronization signal block sent by the base station indicated in the first indication information, determining that the overlapped time-frequency resource position is used for sending the RMSI PDSCH scheduled by the multiplexed CORESET; or determining, for the UE-specific PDSCH scheduled by the multiplexed CORESET, that the synchronization signal block sent by the base station indicated in the first indication information is the synchronization signal block actually sent by the base station, and determining that the UE-specific PDSCH scheduled by the multiplexed CORESET is sent on a time-frequency resource position other than the time-frequency resource position of the synchronization signal block sent by the base station indicated in the first indication information;

(2) if the synchronization indication information comprises the first indication information and the second indication information and the multiplexing information indicates that both the UE-specific CORESET and the other CORESET are multiplexed with the RMSI CORESET, performing the following:

if the time-frequency resource position of a common PDSCH scheduled by the multiplexed CORESET is overlapped with the time-frequency resource position of the synchronization signal block sent by the base station indicated in at least one of the first indication information or the second indication information, determining that the overlapped time-frequency resource position is used for sending the common PDSCH scheduled by the multiplexed CORESET; or, if the time-frequency resource position of a RMSI PDSCH scheduled by the multiplexed CORESET is overlapped with the time-frequency resource position of the synchronization signal block sent by the base station indicated in at least one of the first indication information or the second indication information, determining the overlapped time-frequency resource position is used for sending the RMSI PDSCH scheduled by the multiplexed CORESET; or, determining, for a UE-specific PDSCH scheduled by the multiplexed CORESET, that the synchronization signal block sent by the base station indicated in the second indication information is a synchronization signal block actually sent by the base station, and determining that the UE-specific PDSCH scheduled by the multiplexed CORESET is sent on a time-frequency resource position other than the time-frequency resource position of the synchronization signal block sent by the base station indicated in the second indication information; or, determining the time-frequency resource position for data reception according to the multiplexing information and the synchronization indication information comprises:

(1) if the synchronization indication information comprises the first indication information and does not comprise the second indication information, and the multiplexing information indicates that the UE-specific CORESET and the RMSI CORESET are multiplexed, but neither the UE-specific CORESET nor the RMSI CORESET is multiplexed with the other CORESET, performing the following:

if the time-frequency resource position of a RMSI PDSCH scheduled by the multiplexed CORESET is overlapped with the time-frequency resource position of the synchronization signal block sent by the base station indicated in the first indication information, determining that the overlapped time-frequency resource position is used for sending the RMSI PDSCH scheduled by the multiplexed CORESET; or, determining, for a UE-specific PDSCH scheduled by the multiplexed CORESET, that the synchronization signal block sent by the base station indicated in the first indication information is the synchronization signal block actually sent by the base station, and determining that the UE-specific PDSCH scheduled by the multiplexed CORESET is sent on a time-frequency resource position other than the time-frequency resource position of the synchronization signal block sent by the base station indicated in the first indication information;

(2) if the synchronization indication information comprises the first indication information and the second indication information, and the multiplexing information indicates that the UE-specific CORESET and the RMSI CORESET are multiplexed, but neither the UE-specific CORESET nor the RMSI CORESET is multiplexed with the other CORESET, performing the following:

if a time-frequency resource position of a RMSI PDSCH scheduled by the multiplexed CORESET is overlapped with the time-frequency resource position of the synchronization signal block sent by the base station indicated in at least one of the first indication information or the second indication information, determining that the overlapped time-frequency resource position is used for sending the RMSI PDSCH scheduled by the multiplexed CORESET; or, determining, for a UE-specific PDSCH scheduled by the multiplexed CORESET, that the synchronization signal block sent by the base station indicated in the second indication information is a synchronization signal block actually sent by the base station, and determining that the UE-specific PDSCH scheduled by the multiplexed CORESET is sent on a time-frequency resource position other than the time-frequency resource position of the synchronization signal block sent by the base station indicated in the second indication information; or, determining the time-frequency resource position for data reception according to the multiplexing information and the synchronization indication information comprises:

(1) if the synchronization indication information comprises the first indication information and does not comprise the second indication information, and the multiplexing information indicates that the UE-specific CORESET and the other CORESET are multiplexed, and neither the UE-specific CORESET nor the other CORESET is multiplexed with the RMSI CORESET, performing the following:

determining, for a common PDSCH scheduled by the multiplexed CORESET, that the synchronization signal block sent by the base station indicated in the first indication information is the synchronization signal block actually sent by the base station, and determining that the common PDSCH scheduled by the multiplexed CORESET is sent on a time-frequency resource position other than the time-frequency resource position of the synchronization signal block sent by the base station indicated in the first indication information; or, determining, for a UE-specific PDSCH scheduled by the multiplexed CORESET, that the synchronization signal block sent by the base station indicated in the first indication information is the synchronization signal block actually sent by the base station, and determining that the UE-specific PDSCH scheduled by the multiplexed CORESET is sent on a time-frequency resource position other than the time-frequency resource position of the synchronization signal block sent by the base station indicated in the first indication information;

(2) if the synchronization indication information comprises the first indication information and the second indication information, and the multiplexing information indicates that the UE-specific CORESET and the other CORESET are multiplexed, and neither the UE-specific CORESET nor the other CORESET is multiplexed with the RMSI CORESET, performing the following:

determining, for a common PDSCH scheduled by the multiplexed CORESET, that the synchronization signal block sent by the base station indicated in the first indication information is the synchronization signal block actually sent by the base station, and determining that the common PDSCH scheduled by the multiplexed CORESET is sent on a time-frequency resource position other than the time-frequency resource position of the synchronization signal block sent by the base station indicated in the first indication information; or, determining, for a UE-specific PDSCH scheduled by the multiplexed CORESET, that the synchronization signal block sent by the base station indicated in the second indication information is the synchronization signal block actually sent by the base station, and determining that the UE-specific PDSCH scheduled by the multiplexed CORESET is sent on a time-frequency resource position other than the time-frequency resource position of the synchronization signal block sent by the base station indicated in the second indication information.

6. The method of processing synchronization indication information according to claim 1, further comprising:

if the synchronization indication information comprises the first indication information and does not comprise second indication information, and third indication information sent by the base station to the terminal through a radio resource control signaling is not received, determining that a synchronization signal block sent by a secondary cell needed to be indicated by the third indication information is same as a synchronization signal block sent by the base station indicated in the first indication information, and determining that the received information on a secondary cell carrier is sent on a time-frequency resource position on the secondary cell carrier other than a time-frequency resource position of the synchronization signal block sent by the base station indicated in the first indication information; or if the synchronization indication information comprises the first indication information and the second indication information, and third indication information sent by the base station to the terminal through a radio resource control signaling is not received, determining that a synchronization signal block sent by a secondary cell needed to be indicated by the third indication information is same as a synchronization signal block sent by the base station indicated in the second indication information, and determining that the received information on a secondary cell carrier is sent on a time-frequency resource position on the secondary cell carrier other than a time-frequency resource position of the synchronization signal block sent by the base station indicated in the second indication information; or determining, if third indication information sent by the base station to the terminal through a radio resource control signaling is not received, that a secondary cell does not transmit a synchronization signal block;

wherein the third indication information is used to indicate the synchronization signal block sent by the secondary cell.

7. The method of processing synchronization indication information according to claim 1, further comprising:

receiving fourth indication information sent by the base station through a radio resource control signaling, wherein the fourth indication information is used to indicate a synchronization signal block needed to be measured by the terminal; and measuring, within a synchronization-signal-block-based radio resource management measurement timing configuration (SMTC) measurement period, the synchronization signal block indicated in the fourth indication information.

8. The method of processing synchronization indication information according to claim 1, further comprising:

if the synchronization indication information comprises the first indication information and does not comprise second indication information, and fourth indication information sent by the base station to the terminal through a radio resource control signaling is not received, determining that a synchronization signal block needed to be measured by the terminal which needs to be indicated in the fourth indication information is same as a synchronization signal block sent by the base station indicated in the first indication information, and, measuring the synchronization signal block indicated by the first indication information within a synchronization-signal-block-based radio resource management measurement timing configuration (SMTC) measurement period;

if the synchronization indication information comprises the first indication if the synchronization indication information comprises the first indication information and the second indication information, fourth indication information sent by the base station to the terminal through a radio resource control signaling is not received, determining that a synchronization signal block needed to be measured by the terminal which needs to be indicated in the fourth indication information is same as a synchronization signal block sent by the base station indicated in the second indication information, and, measuring the synchronization signal block indicated by the second indication information within a SMTC measurement period; wherein the fourth indication information is used to indicate a synchronization signal block needed to be measured by the terminal.

9. The method of processing synchronization indication information according to claim 1, further comprising:

receiving fifth indication information sent by the base station through a radio resource control signaling, wherein the fifth indication information is used to indicate a synchronization signal block needed to be measured by the terminal and being used for radio link monitoring; and measuring the synchronization signal block indicated in the fifth indication information, and using the measurement for the radio link monitoring.

10. The method of processing synchronization indication information according to claim 1, further comprising:

if the synchronization indication information comprises the first indication information and does not comprise the second indication information, and fifth indication information sent by the base station to the terminal through a radio resource control signaling is not received, determining that a synchronization signal block needed to be measured by the terminal and being used for radio link monitoring which needs to be indicated in the fifth indication information is same as a synchronization signal block sent by the base station indicated in the first indication information, measuring the synchronization signal block indicated in the first indication information and using the measurement for the radio link monitoring;

if the synchronization indication information comprises the first indication information and the second indication information, fifth indication information sent by the base station to the terminal through a radio resource control signaling is not received, determining that a synchronization signal block needed to be measured by the terminal and being used for radio link monitoring which needs to be indicated in the fifth indication information is same as a synchronization signal block sent by the base station indicated in the second indication information, measuring the synchronization signal block indicated in the second indication information and using the measurement for the radio link monitoring;

wherein the fifth indication information is used to indicate the synchronization signal block needed to be measured by the terminal and being used for the radio link monitoring.

11. A method of indicating a synchronization signal block, the method being applied to a base station and comprising:
sending synchronization indication information to a terminal; and
determining a time-frequency resource position of a synchronization signal block to be sent to the terminal according to second indication information if the synchronization indication information comprises first indication information and the second indication information, and if the time-frequency resource position of the synchronization signal block determined according to the first indication information or the time-frequency resource position of the synchronization signal block determined according to the second indication information is overlapped with a time-frequency resource position of a Physical Downlink Shared Channel (PDSCH), determining that an overlapped time-frequency resource position of the synchronization signal block and the PDSCH is used to transmit the PDSCH; or,
determining a time-frequency resource position of a synchronization signal block to determining a time-frequency resource position of a synchronization signal block to be sent to the terminal according to the first indication information if the synchronization indication information comprises the first indication information and does not comprise the second indication information, and if the time-frequency resource position of the synchronization signal block determined according to the first indication information or the time-frequency resource position of the synchronization signal block determined according to the second indication information is overlapped with a time-frequency resource position of a Physical Downlink Shared Channel (PDSCH), determining that an overlapped time-frequency resource position of the synchronization signal block and the PDSCH is used to transmit the PDSCH;
wherein the first indication information is sent by the base station through system information and the second indication information is sent by the base station through a radio resource control signaling.

12. The method of indicating a synchronization signal block according to claim 11, wherein, sending the synchronization indication information comprises:
sending the second indication information to the first terminal and the second terminal through a radio resource control signaling, wherein the second indication information corresponding to the first terminal indicates a synchronization signal block sent by the base station through the first beam on a current time-frequency resource, the second indication information corresponding to the second terminal indicates that the base station does not transmit a synchronization signal block through the second beam on a current time-frequency resource, or, both the second indication information corresponding to the first terminal and the second indication information corresponding to the second terminal indicate a synchronization signal block sent by the base station on a current time-frequency resource.

13. The method of indicating a synchronization signal block according to claim 11, further comprising:
sending third indication information to a terminal through a radio resource control signaling, wherein the third indication information is used to indicate a synchronization signal block to be sent by a secondary cell.

14. The method of indicating a synchronization signal block according to claim 11, further comprising:
sending fourth indication information to a terminal through a radio resource control signaling, wherein the fourth indication information is used to indicate a synchronization signal block needed to be measured by the terminal.

15. The method of indicating a synchronization signal block according to claim 11, further comprising:
sending fifth indication information to a terminal through a radio resource control signaling, wherein the fifth indication information is used to indicate a synchronization signal block needed to be measured by the terminal and being used for radio link monitoring.

16. The method of indicating a synchronization signal block according to claim 15, wherein, the fifth indication information indicates, in a bitmap manner, the synchronization signal block needed to be measured and being used for the radio link monitoring; or
the fifth indication information indicates the number of synchronization signal blocks needed to be measured and being used for radio link monitoring; or
the fifth indication information indicates a time index of a synchronization signal block needed to be measured and being used for radio link monitoring.

17. A terminal, comprising:
a processor, a storage and a computer program stored on the storage and executable by the processor, wherein when the computer program is executed by the processor, the processor implements following steps:
receiving synchronization indication information sent by a base station; and
determining a time-frequency resource position of a synchronization signal block to be sent by the base station according to second indication information if the synchronization indication information comprises first indication information and the second indication information, and if the time-frequency resource position of the synchronization signal block is overlapped with a time-frequency resource position of a Physical Downlink Shared Channel (PDSCH), determining that an overlapped time-frequency resource position of the synchronization signal block and the PDSCH is used to transmit the PDSCH; or,
determining a time-frequency resource position of a synchronization signal block to determining a time-frequency resource position of a synchronization signal block to be sent by the base station according to the first indication information if the synchronization indication information comprises the first indication information and does not comprise the second indication information, and if the time-frequency resource position of the synchronization signal block is overlapped with a time-frequency resource position of a Physical Downlink Shared Channel (PDSCH), determining that an overlapped time-frequency resource position of the synchronization signal block and the PDSCH is used to transmit the PDSCH; wherein the first indication information is sent by the base station through system information and the second indication information is sent by the base station through a radio resource control signaling.

18. A base station, comprising:
a processor, a storage and a computer program stored on the storage and executable by the processor, wherein when the computer program is executed by the processor, the processor implements the method of indicating a synchronization signal block according to claim 11.

19. The terminal according to claim 17, wherein, when the computer program is executed by the processor, the processor further implements following steps:
determining multiplexing information among at least two of a Remaining Minimum System Information Control Resource Set (RMSI CORESET), a User Equipment-specific CORESET (UE-specific CORESET) and an other CORESET; and,
determining a time-frequency resource position for data reception according to the multiplexing information and the synchronization indication information, wherein the received information comprises at least one of:
the RMSI CORESET, an RMSI Physical Downlink Shared Channel (PDSCH), the UE-specific CORESET, a UE-specific PDSCH, a common PDSCH or an other CORESET.

20. The method of processing synchronization indication information according to claim 2, wherein determining the time-frequency resource position for data reception according to the multiplexing information and the synchronization indication information comprises:
if the multiplexing information indicates that the UE-specific CORESET and the other CORESET are multiplexed, but neither the UE-specific CORESET nor the other CORESET is multiplexed with the RMSI CORESET, determining that the synchronization signal block sent by the base station indicated in the first indication information is a synchronization signal block actually sent by the base station, and determining that the multiplexed CORESET is sent on a time-frequency resource position other than the time-frequency resource position of the synchronization signal block sent by the base station indicated in the first indication information.

* * * * *